US012003475B2

(12) United States Patent
Jiang et al.

(10) Patent No.: US 12,003,475 B2
(45) Date of Patent: Jun. 4, 2024

(54) EMAIL SYNCHRONIZATION METHOD AND ELECTRONIC DEVICE

(71) Applicant: HUAWEI TECHNOLOGIES CO., LTD., Guangdong (CN)

(72) Inventors: Guoliang Jiang, Shenzhen (CN); Chenshu Li, Shenzhen (CN); Fucheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/042,551

(22) PCT Filed: Aug. 20, 2021

(86) PCT No.: PCT/CN2021/113879

§ 371 (c)(1),
(2) Date: Feb. 22, 2023

(87) PCT Pub. No.: WO2022/042451

PCT Pub. Date: Mar. 3, 2022

(65) Prior Publication Data

US 2023/0344793 A1 Oct. 26, 2023

(30) Foreign Application Priority Data

Aug. 25, 2020 (CN) ......................... 202010865744.5

(51) Int. Cl.
*G06F 15/16* (2006.01)
*H04L 51/42* (2022.01)

(52) U.S. Cl.
CPC .................................... *H04L 51/42* (2022.05)

(58) Field of Classification Search
CPC ....................................................... H04L 51/42

(Continued)

(56) References Cited

U.S. PATENT DOCUMENTS

| | | | | |
|---|---|---|---|---|
| 6,052,735 A | 4/2000 | Ulrich et al. | | |
| 2004/0133644 A1* | 7/2004 | Warren | H04L 51/42 709/206 | |

(Continued)

FOREIGN PATENT DOCUMENTS

| | | |
|---|---|---|
| CN | 1518304 A | 8/2004 |
| CN | 1522013 A | 8/2004 |

(Continued)

OTHER PUBLICATIONS

Wang, "Research and Design of Pushemail Service," Thesis for the degree of Master of Computer Science and Technology, Beijing University of Posts and Telecommunications, Feb. 1, 2009, 110 pages (with English abstract).

(Continued)

*Primary Examiner* — Bharat Barot
(74) *Attorney, Agent, or Firm* — Fish & Richardson P.C.

(57) ABSTRACT

The present disclosure relates to email synchronization methods and electronic devices. In one example method, an electronic device obtains an email identifier of an email. The electronic device sends, to a server, a first request including the email identifier. The electronic device receives a first response from the server and extracts the email and the structure information from the first response. The electronic device determines object identifiers of objects in the message body based on the structure information. The electronic device sends a second request to the server if information of a first object in the message body fails to be downloaded, where the second request includes the email identifier and an object identifier of the first object. The electronic device receives a second response from the server and extracts the information of the first object from the second response.

12 Claims, 16 Drawing Sheets

(58) Field of Classification Search
USPC .................................................. 709/206–207
See application file for complete search history.

(56) References Cited

U.S. PATENT DOCUMENTS

| | | | | |
|---|---|---|---|---|
| 2005/0076086 | A1 | 4/2005 | Budd et al. | |
| 2005/0076087 | A1 * | 4/2005 | Budd | G06Q 10/107 709/206 |
| 2006/0047756 | A1 * | 3/2006 | Piispanen | H04L 51/063 709/206 |
| 2007/0094334 | A1 * | 4/2007 | Hoffman | H04L 51/00 709/206 |
| 2009/0157831 | A1 | 6/2009 | Tian et al. | |
| 2009/0228716 | A1 | 9/2009 | Poston et al. | |
| 2012/0209928 | A1 | 8/2012 | Warren et al. | |
| 2016/0219024 | A1 | 7/2016 | Verzun et al. | |
| 2016/0359786 | A1 * | 12/2016 | Jhaveri | H04L 51/42 |
| 2019/0222560 | A1 | 7/2019 | Ford et al. | |
| 2020/0092734 | A1 * | 3/2020 | Zhu | H04W 24/08 |
| 2021/0006619 | A1 * | 1/2021 | Chen | H04L 51/42 |

FOREIGN PATENT DOCUMENTS

| | | | |
|---|---|---|---|
| CN | 101009667 | A | 8/2007 |
| CN | 101098313 | A | 1/2008 |
| CN | 101106537 | A | 1/2008 |
| CN | 101272354 | A | 9/2008 |
| CN | 101711386 | A | 5/2010 |
| CN | 101989335 | A | 3/2011 |
| CN | 103200022 | A | 7/2013 |
| CN | 104182416 | A | 12/2014 |
| CN | 104601724 | A | 5/2015 |
| CN | 105898717 | A | 8/2016 |
| CN | 106549984 | A | 3/2017 |
| CN | 111095877 | A | 5/2020 |
| WO | 2017071204 | A1 | 5/2017 |
| WO | 2019071617 | A1 | 4/2019 |

OTHER PUBLICATIONS

Shiravi et al., "Toward developing a systematic approach to generate benchmark datasets for intrusion detection," Computers and Security, May 2012, 18 pages.
Office Action in Chinese Appln. No. 202010865744.5, dated Jun. 22, 2022, 19 pages (with English translation).
International Search Report and Written Opinion in International Appln. No. PCT/CN2021/113879, dated Oct. 13, 2021, 21 pages (with English translation).
Extended European Search Report in European Appln No. 21860288.6, dated Jan. 2, 2024, 9 pages.

* cited by examiner

EMAIL SYNCHRONIZATION METHOD AND ELECTRONIC DEVICE

CROSS-REFERENCE TO RELATED APPLICATIONS

This application is a National Stage of International Application No. PCT/CN2021/113879, filed on Aug. 20, 2021, which claims priority to Chinese Patent 202010865744.5, filed on Aug. 25, 2020. Both of the aforementioned applications are hereby incorporated by reference in their entireties.

TECHNICAL FIELD

This application relates to the field of email technologies, and in particular, to an email synchronization method and an electronic device.

BACKGROUND

Currently, more and more users need to work on different electronic devices (for example, a mobile terminal and a desktop computer), and Email serves as an important tool in work. A user may log in to an account on an email client of any electronic device, and the email client of the electronic device synchronizes emails under the account from a server. In this way, the email client of the electronic device can obtain the emails under the account, and display the emails under the account to the user, so that the user can view the emails via the email client.

Specifically, a process in which an email client of an electronic device synchronizes an email under an account from a server includes: The email client obtains from the server, an email identifier of a to-be-synchronized email under the account; requests from the server, the email indicated by the email identifier; and then receives from the server, the email indicated by the email identifier. The to-be-synchronized email may include an email body and additional information, and the additional information includes an embedded resource and/or an attachment.

In the foregoing solution to synchronize the email, all information of the email can be downloaded simultaneously, that is, the email body and the additional information of the email are downloaded at the same time. In this case, there may be a problem that the email body of the email is successfully downloaded while the additional information of the email fails to be downloaded. Currently, if the additional information of the email fails to be downloaded, the email can be downloaded again only by re-logging in to the account on the email client and synchronizing the email under the account from the server.

For the problem that the additional information of the email fails to be downloaded, a user needs to re-log in to the account on the email client to download the email again, which increases complexity and traffic consumption of email synchronization.

SUMMARY

This application provides an email synchronization method and an electronic device, to reduce complexity and traffic consumption of email synchronization.

To achieve the foregoing technical objective, the following technical solutions are used in this application.

According to a first aspect, this application provides an email synchronization method, and the method is applied to an electronic device installed with an email client. The method includes: The electronic device obtains an email identifier of an email to be synchronized by the email client; sends, to a server, a first request including the email identifier; receives a first response from the server, and extracts the email and structure information from the first response; determines object identifiers of objects in a message body based on the structure information; and sends a second request to the server if information of a first object in the message body fails to be downloaded; and receives a second response from the server, and extracts the information of the first object from the second response.

The first request is used to request to obtain the email and the structure information of the message body of the email, and the structure information is used to represent a data structure of the message body of the email. The objects in the message body include: an email body of the email, or the email body of the email and additional information of the email. The additional information includes an embedded resource and/or an attachment. The second request includes the email identifier and an object identifier of the first object, and the second request is used to request to obtain the information of the first object.

In the foregoing method, the electronic device may send the first request to the server, to request, from the server, to obtain the email indicated by the email identifier and the structure information of the message body of the email. After sending the first request, the electronic device may receive the first response from the server, and the first response includes the email and the structure information of the message body of the email. In this way, the electronic device can not only obtain the entire email, that is, download all information of the email at a time, but also obtain the structure information of the message body of the email.

In this way, the electronic device may determine the object identifiers of the objects in the message body based on the structure information. In this way, when the information of the first object in the message body of the email fails to be downloaded, the electronic device may send, by using the object identifier of the first object, the second request for requesting the information of the first object to the server, to request to obtain the information of the first object from the server.

According to the foregoing solution, a problem that a part of the information cannot be re-downloaded when the part of the information of the electronic device fails to be downloaded because the electronic device downloads all the information of the email at a time can be resolved. According to the method in this application, the electronic device may re-download the information of the first object by using the object identifier of the first object that fails to be downloaded. Compared with a method of re-logging in to an account to resynchronize the email in the conventional technology, complexity of synchronizing the email by an electronic device can be reduced by using this solution. In addition, the electronic device re-downloads only the information of the first object that fails to be downloaded. Compared with re-downloading the entire email, traffic consumption of email synchronization is reduced.

In a possible implementation, that the electronic device sends a second request to the server if information of a first object in the message body fails to be downloaded includes: The electronic device sends first prompt information if the information of the first object fails to be downloaded, and sends the second request to the server in response to a first operation entered by a user. The first prompt information is used to indicate that the information of the first object fails to be downloaded, and the first prompt information is further used to request the user to check whether to re-download the information of the first object. The first operation is used to indicate the electronic device to re-download the information of the first object.

In this design manner, if the electronic device determines that the information of the first object in the message body of the email fails to be downloaded, the electronic device may first send the first prompt information, to notify the user that the information of the first object fails to be downloaded, so that the user chooses whether to re-download the information of the first object. When the user chooses to re-download the information of the first object, the electronic device sends, to the server, the second request used to request to obtain the information of the first object. In this way, based on an actual requirement of the user, the information of the first object that fails to be downloaded may be re-downloaded only for the email required by the user. Compared with re-downloading all information of all to-be-synchronized emails, traffic consumption of email synchronization is reduced.

In another possible implementation, after the electronic device receives the second response from the server, and extracts the information of the first object from the second response, the method further includes: The electronic device sends second prompt information if the information of the first object fails to be extracted from the second response; the electronic device resends a third request to the server in response to a second operation entered by a user; and the electronic device receives a third response from the server, and extracts the information of the first object from the third response. The second prompt information is used to indicate that the information of the first object fails to be downloaded, and the second prompt information is further used to request the user to check whether to re-download the information of the first object. The second operation is used to indicate the electronic device to re-download the information of the first object, and the third request is used to request to obtain the information of the first object.

In this design manner, after automatically re-downloading the information of the first object, the electronic device sends second prompt information if the information of the first object fails to be downloaded again. In addition to notifying the user that the information of the first object fails to be downloaded, the second prompt information is further used to request the user to check whether to re-download the information of the first object; that is, provides the user with an entry for continuing to re-download the information of the first object. Further, the user may manually control to continue to re-download the information of the first object, or may further control to continue to re-download the information of the first object in a proper case such as a stable communication network. Compared with a method of re-logging in to an account to resynchronize the email, complexity of email synchronization is reduced, and a success rate of the email synchronization is improved.

In another possible implementation, the structure information is used to represent the data structure of the message body of the email, and the data structure is used to represent a sequence of the objects in the message body. That the electronic device determines object identifiers of objects in a message body based on the structure information includes: The electronic device determines the object identifiers of the objects in the message body based on the sequence of the objects in the message body.

This design manner provides a specific implementation in which the electronic device determines the object identifiers of the objects in the message body based on the structure information.

According to a second aspect, this application further provides an electronic device, and an email client is installed on the electronic device. The electronic device includes: an information processing module, configured to obtain an email identifier of an email to be synchronized by the email client; a sending module, configured to send a first request including the email identifier to a server; and a receiving module, configured to receive a first response from the server. The information processing module is further configured to extract the email and the structure information from the first response and determine object identifiers of objects in the message body based on the structure information, the sending module is configured to send a second request to the server if information of a first object in the message body fails to be downloaded, the receiving module is further configured to receive a second response from the server, and the information processing module is further configured to extract the information of the first object from the second response. The first request is used to request to obtain the email and the structure information of the message body of the email, and the structure information is used to represent a data structure of the message body of the email. The objects in the message body include: an email body of the email, or the email body of the email and additional information of the email, and the additional information includes an embedded resource and/or an attachment. The second request includes the email identifier and an object identifier of the first object, and the second request is used to request to obtain the information of the first object.

In a possible implementation, the information processing module is further configured to send first prompt information if the information of the first object fails to be downloaded, and the sending module is configured to send the second request to the server in response to a first operation entered by a user. The first prompt information is used to indicate that the information of the first object fails to be downloaded, and the first prompt information is further used to request the user to check whether to re-download the information of the first object. The first operation is used to indicate the electronic device to re-download the information of the first object.

In another possible implementation, the information processing module is further configured to send second prompt information if the information of the first object fails to be extracted from the second response; the sending module is further configured to resend a third request to the server in response to a second operation entered by the user; the receiving module is further configured to receive a third response from the server; and the information processing module is further configured to extract the information of the first object from the third response. The second prompt information is used to indicate that the information of the first object fails to be downloaded, and the second prompt information is further used to request the user to check whether to re-download the information of the first object. The second operation is used to indicate the electronic device to re-download the information of the first object, and the third request is used to request to obtain the information of the first object.

In another possible implementation, the structure information is used to represent the data structure of the message body of the email, and the data structure is used to represent a sequence of the objects in the message body. The information processing module is specifically configured to determine the object identifiers of the objects in the message body based on the sequence of the objects in the message body.

According to a third aspect, this application further provides an electronic device. The electronic device includes a processor and a memory configured to store executable instructions of the processor. The processor is configured to execute the instructions, to implement the email synchronization method according to any one of the first aspect and the possible implementations of the first aspect.

According to a fourth aspect, this application further provides a computer-readable storage medium. The computer-readable storage medium stores computer instructions, and when the computer instructions are run on an electronic device, the electronic device is enabled to perform the email synchronization method according to any one of the first aspect and the possible implementations of the first aspect.

According to a fifth aspect, this application further provides a computer program product, including one or more instructions. When the one or more instructions are run on an electronic device, the electronic device is enabled to perform the email synchronization method according to any one of the first aspect and the possible implementations of the first aspect.

For technical effects brought by any one of the second aspect and the possible design manners of the second aspect, the third aspect, the fourth aspect, and the fifth aspect in embodiments of this application, refer to technical effects brought by different design manners of the first aspect. Details are not described herein again.

DESCRIPTION OF EMBODIMENTS

Terms “first”, “second”, and the like in embodiments of this application are used to distinguish between different objects or between different processing on a same object, but are not used to describe a specific order of the objects. For example, a first request and a second request are different requests.

Embodiments of this application provide an email synchronization method, and the following describes implementations of embodiments of this application in detail with reference to accompanying drawings.

Figure 1:
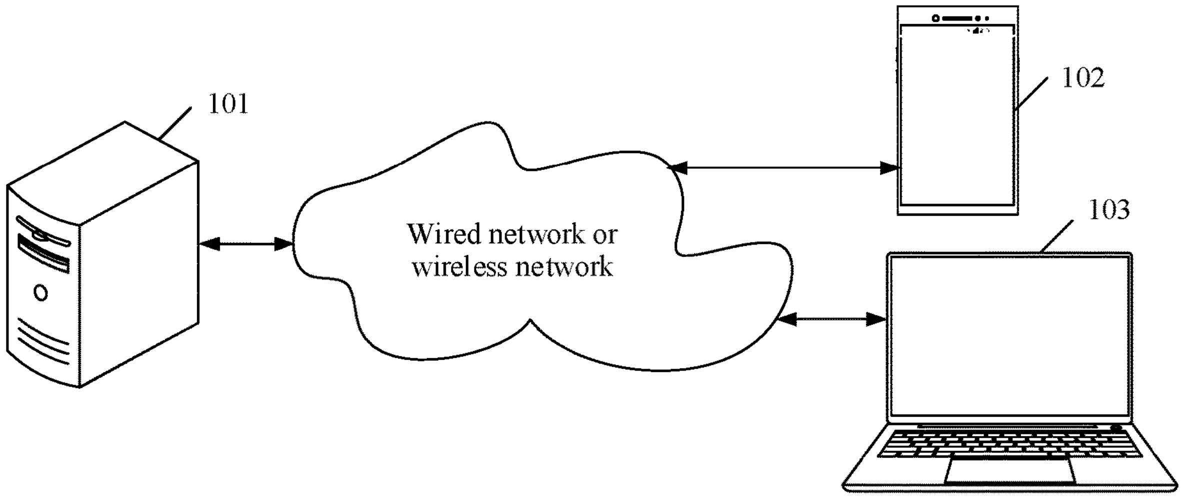
FIG. 1 is a schematic diagram of an implementation environment of an email synchronization method according to an embodiment of this application.

FIG. 1 is a schematic diagram of an implementation environment related to an email synchronization method according to an embodiment of this application. As shown in FIG. 1, the implementation environment may include a server 101 and a plurality of electronic devices, for example, an electronic device 102 and an electronic device 103. The server 101 may provide an application service for an email box. The server 101 may transmit, by using a wired network or a wireless network, an email to any electronic device (for example, the electronic device 102 or the electronic device 103) that uses the email box.

It should be noted that a quantity of electronic devices and a quantity of servers in FIG. 1 are merely examples. There may be any quantity of electronic devices and servers based on an actual requirement.

Specifically, the electronic device 102 is used as an example. An email client of an email box is installed on the electronic device 102. In a state in which a user logs in to an account, the email client of the electronic device 102 may send an email to an email box of another account by using the server 101, or may receive an email from another account by using the server 101. Emails sent and received by an email box of each account are stored in the server 101. In this way, after logging in to the account on an email client of any electronic device, the user may synchronize an email under the account from the server 101, that is, download the email under the account from the server 101.

It should be noted that the email synchronization method provided in embodiments of this application may be applied to an electronic device. An execution body of the email synchronization method may alternatively be an email synchronization apparatus. The email synchronization apparatus may be a central processing unit (Central Processing Unit, CPU) in the electronic device, or a control module configured to execute the email synchronization method in the electronic device.

It should be noted that the electronic device in embodiments of this application may be a mobile phone, a tablet computer, a desktop computer, a laptop computer, a handheld computer, a notebook computer, an ultra-mobile personal computer (ultra-mobile personal computer, UMPC), a netbook, or the like. A specific form of the electronic device is not specially limited in embodiments of this application.

Figure 2:
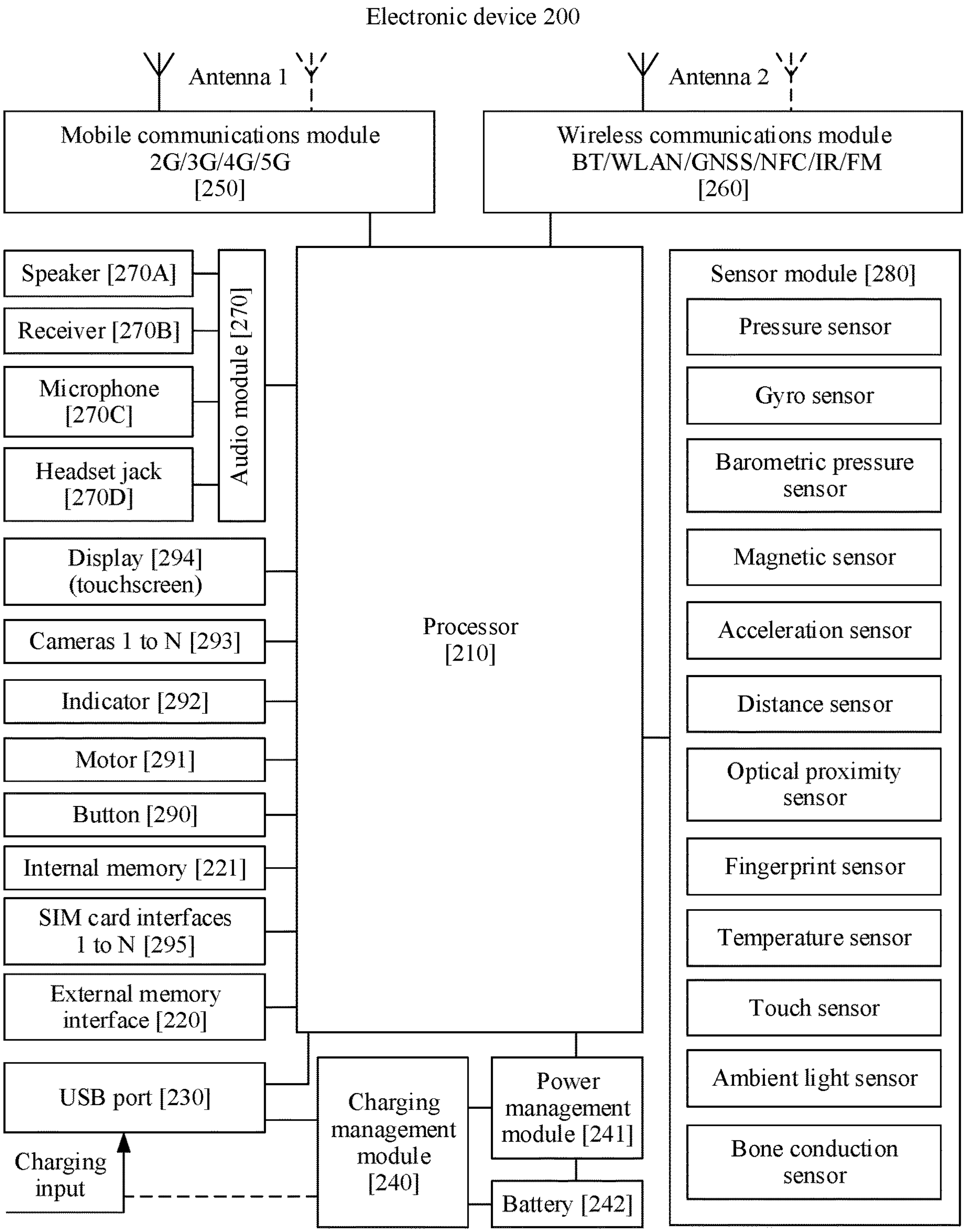
FIG. 2 is a schematic diagram of a hardware structure of an electronic device according to an embodiment of this application.

The following describes a hardware structure of an electronic device by using an example in which any electronic device installed with the email client is a mobile phone. As shown in FIG. 2, an electronic device 200 may include a processor 210, an external memory interface 220, an internal memory 221, a universal serial bus (universal serial bus, USB) port 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 1 to N 293, a display 294 (such as a touchscreen), a subscriber identification module (subscriber identification module, SIM) card interface 1 to N 295, and the like.

The sensor module 280 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment does not constitute a specific limitation on the electronic device 200. In some other embodiments, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 200. The controller may generate an operation control signal based on an instruction operation code and a time sequence signal, to complete control of instruction fetching and instruction execution.

A memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor may directly invoke the instructions or the data from the memory. This avoids repeated access, reduces waiting time of the processor 210, and improves system efficiency.

In some embodiments, the processor 210 may include one or more interfaces. It may be understood that an interface connection relationship between the modules shown in this embodiment is merely an example for description, and does not constitute a limitation on the structure of the electronic device 200. In some other embodiments, the electronic device 200 may alternatively use an interface connection manner different from that in the foregoing embodiment, or a combination of a plurality of interface connection manners.

The charging management module 240 is configured to receive a charging input from a charger (a charging input of a wired charger and/or a wireless charging input) to charge the battery 242. The charger may be a wireless charger, or a wired charger. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display 294, the camera 293, the wireless communications module 260, and the like. In some embodiments, the power management module 241 may alternatively be disposed in the processor 210. In some other embodiments, the power management module 241 and the charging management module 240 may alternatively be disposed in a same device.

A wireless communication function of the electronic device 200 may be implemented by using the antenna 1, the antenna 2, the mobile communications module 250, the wireless communications module 260, the modem processor, the baseband processor, and the like. The antenna 1 and the antenna 2 are configured to transmit and receive an electromagnetic wave signal. In some embodiments, in the electronic device 200, the antenna 1 and the mobile communications module 250 are coupled, and the antenna 2 and the wireless communications module 260 are coupled, so that the electronic device 200 can communicate with a network and another device by using a wireless communications technology. The wireless communications technology may include a global navigation satellite system (Global Navigation Satellite System, GNSS), a wireless local area network (wireless local area network, WLAN) (for example, a Wi-Fi network) technology, and the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS). For example, the electronic device 200 may obtain real-time location information of the electronic device 200 by using a positioning technology such as the GPS, the BDS, or the SBAS.

The mobile communications module 250 may provide a wireless communication solution that includes 2G/3G/4G/5G or the like and that is applied to the electronic device 200. For example, the electronic device 200 may send an email to a server by using the mobile communications module 250.

The wireless communications module 260 may provide a wireless communication solution that includes a WLAN (for example, a Wi-Fi network), Bluetooth (Bluetooth, BT), a GNSS, near field communication (Near Field Communication, NFC), infrared (Infrared, IR), frequency modulation (frequency modulation, FM), or the like and that is applied to the electronic device 200. For example, the electronic device 200 may obtain real-time location information of the electronic device 200 by using the GNSS positioning technology.

The electronic device 200 implements a display function by using the GPU, the display 294, the application processor, and the like. The electronic device 200 may implement a photographing function by using the ISP, the camera 293, the video codec, the GPU, the display 294, the application processor, and the like. The external memory interface 220 may be configured to connect to an external storage card, for example, a Micro SD card, to extend a storage capability of the electronic device 200. The internal memory 221 may be configured to store computer-executable program code. The executable program code includes instructions. The processor 210 runs the instructions stored in the internal memory 221, to perform various function applications of the electronic device 200 and data processing. The electronic device 200 may implement an audio function by using the audio module 270, the speaker 270A, the receiver 270B, the microphone 270C, the headset jack 270D, the application processor, and the like.

In embodiments of this application, an email box may be an email box that uses interactive mail access protocol (Interactive Mail Access Protocol, IMAP). The IMAP protocol is an email protocol defined by transmission control protocol/internet protocol (Transmission Control Protocol/Internet Protocol, TCP/IP) protocol. An email client of the email box can synchronize an email from a server through the IMAP protocol.

In embodiments of this application, an email may be an MIME email, that is, an email that complies with the MIME specification. MIME is a currently widely used email technical specification, and provides a method for adding a plurality of different coding files to an email, so that the email can carry binary files such as a picture, sound, and a video in addition to common plain text. The MIME email may include a plain text body, may include a plain text body and a hypertext body, or include a plain text body, a hypertext body, an embedded resource, and an attachment.

The embedded resource is specific to the MIME email and is used to store a picture, animation, sound, and even a CSS style and a piece of script associated with an email body. Usually, a hyperlink is used to associate with the embedded resource within the hypertext body of the MIME email. The embedded resource is accessed when content of the email is browsed.

Figure 3:
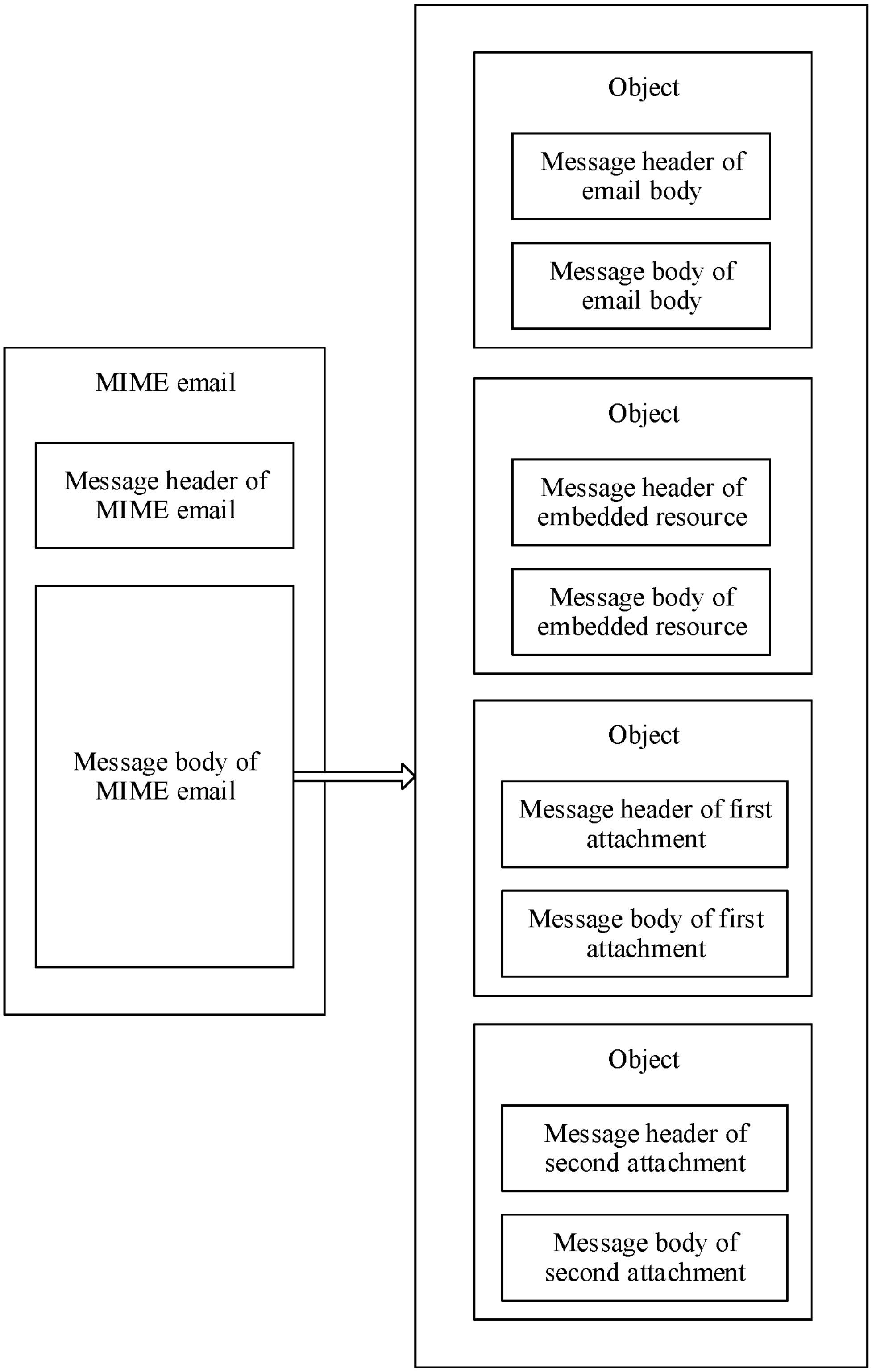
FIG. 3 is a schematic composition diagram of a multipurpose internet mail extensions (Multipurpose Internet Mail Extensions, MIME) mail according to an embodiment of this application.

For example, refer to a schematic composition diagram of an MIME email (MIMEMessage) shown in FIG. 3. The MIME email includes two parts: a message header (which may also be referred to as an email header) and a message body (which may also be referred to as an email body). The message header of the MIME email may include important information such as a sender, a recipient, a subject, time, an MIME version, and an email content type. The message body of the MIME email includes content of the email (which may be referred to as email content for short). The email content may be formed by one or more objects (MimeBodyPart), and each object also includes two parts: a message header and a message body. As shown in FIG. 3, the message body of the MIME email includes information of at least four objects: an email body, an embedded resource, a first attachment, and a second attachment. The message body of the MIME email specifically includes: a message header and a message body of the email body, a message header and a message body of the embedded resource, a message header and a message body of the first attachment, and a message header and a message body of the second attachment.

Currently, a process in which an email client of an electronic device synchronizes an email under an account from a server includes: The email client obtains from the server, an email identifier of a to-be-synchronized email under the account; requests from the server, the email indicated by the email identifier; and then receives from the server, an entire email indicated by the email identifier from the server, that is, the to-be-synchronized email. The to-be-synchronized email is divided into two parts: a message header and a message body. The message body of the email is divided into one or more objects. For example, a plurality of objects may include an email body and additional information, and the additional information includes an embedded resource and/or an attachment.

The foregoing solution is used to synchronize the email. The server sends, to the email client of the electronic device, all information of the email indicated by the email identifier as a whole (that is, the entire email). The email client can download all the information of the email at a time by downloading the entire email, including the email body and the additional information of the email. When downloading the entire email, there may be a problem that the email body of the email is successfully downloaded, but the additional information of the email fails to be downloaded. Because the entire email downloaded by the email client refers to all the information of the email, the additional information that fails to be downloaded cannot be separately requested from the server by using all the information of the email. Therefore, a user can only re-log in to the account on the email client to re-download the entire email, which increases complexity and traffic consumption of email synchronization. In addition, when the email is downloaded again, there is a possibility that the additional information of the email fails to be downloaded. Therefore, a success rate of the email synchronization is low.

Figure 4:
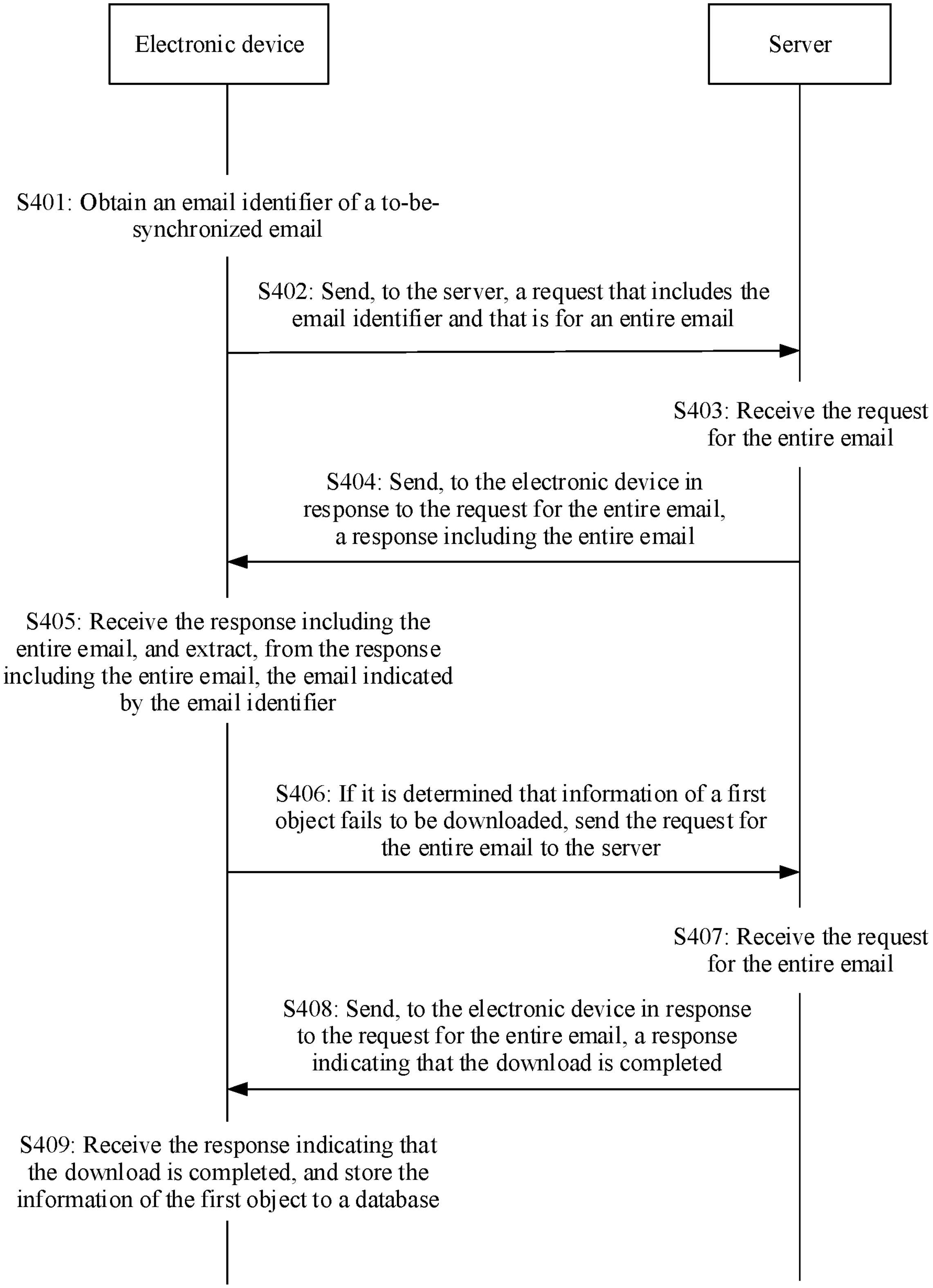
FIG. 4 is a flowchart of an email synchronization method used in the conventional technology.

For example, an email client and a server that use an IMAP protocol to synchronize an email are used as an example. After a user logs in to an account (for example, an IMAP account) of the email client, an electronic device may periodically obtain, from the server, an email identifier of a to-be-synchronized email of the email client. Each time after obtaining the email identifier of the to-be-synchronized email, the electronic device synchronizes, from the server, all information of the email indicated by the email identifier. Specifically, as shown in FIG. 4, a process in which an electronic device and a server synchronize an email by using the foregoing solution includes S401 to S409.

S401: The electronic device obtains an email identifier of a to-be-synchronized email.

The email identifier of the to-be-synchronized email may include email identifiers of one or more emails. The electronic device performs S402 to S409 for the email identifier of each email.

S402: The electronic device sends, to the server, a request that includes the email identifier and that is for an entire email.

The request for the entire email is used to request to obtain the entire email indicated by the email identifier.

The request for the entire email may be generated based on a fetch instruction, and the fetch instruction is an instruction that is used in the IMAP protocol and that is applied to receiving the email on the server.

For example, a format of the request for the entire email may be UID FETCH MESSAGE-ID (UID BODY[ ]). The email unique identifier (The unique identifier for the message, UID) is a fixed character, and is used to indicate a number that uniquely identifies the email, that is, used to indicate the email identifier. MESSAGE-ID is the email identifier. BODY[ ] represents obtaining the entire email, that is, all information of the email, including a message header of the email and a message body of the email.

S403: The server receives the request for the entire email.

S404: The server sends, to the electronic device in response to the request for the entire email, a response including the entire email.

S405: The electronic device receives the response including the entire email, and extracts, from the response including the entire email, the email indicated by the email identifier.

The electronic device extracts the message header of the email and the message body of the email from the response (response) including the entire email, then sequentially obtains information of objects from the message body of the email, and determines whether the information of the objects is successfully downloaded. S406 is performed if it is determined that information of a first object in the message body of the email fails to be downloaded. If the electronic device determines that the information of the first object in the message body of the email is successfully downloaded, the electronic device stores the information of the first object to a database.

The first object is any object in the message body of the email.

It should be noted that "the information of the first object is successfully downloaded" in this embodiment of this application may mean that the obtained information of the first object is complete. Correspondingly, that "the information of the first object fails to be downloaded" in this embodiment of this application may mean that the obtained information of the first object is incomplete.

It should be noted that the electronic device may determine, based on file sizes of the obtained information of the objects, whether the information of the objects is successfully downloaded, or determine, based on whether the obtained information of the objects includes an identifier indicating a download success, whether the information of the objects is successfully downloaded. A specific implementation of determining whether the information of the objects is successfully downloaded is not limited in this embodiment of this application.

S406: If the electronic device determines that the information of the first object fails to be downloaded, the electronic device sends the request for the entire email.

S407: The server receives the request for the entire email.

S408: The server sends, to the electronic device in response to the request for the entire email, a response indicating that the download is completed.

S409: The electronic device receives the response indicating that the download is completed, and stores the information of the first object to the database.

The electronic device receives the response indicating that the download is completed, and stores, to the database, the information that is of the first object and that is obtained in S405. The information that is of the first object and that is obtained in S405 is incomplete.

It should be noted that the electronic device may perform S401, S402, S405, S406, and S409 through an email client.

Further, after obtaining any to-be-synchronized email, the electronic device displays email content of the email in response to an operation that is entered by a user and that is of viewing the email. The email content of the email includes information of all objects in the message body of the email. If information of an object in the message body of the email fails to be downloaded, the email client of the electronic device cannot open the information of the object. In addition, a file size of the object may be 0 bytes (OB), or a file size of the object is equal to a file size of a part that has been successfully downloaded in the object. For example, information of an attachment fails to be downloaded, and the mail client of the electronic device cannot open the information of the attachment.

Figure 5:
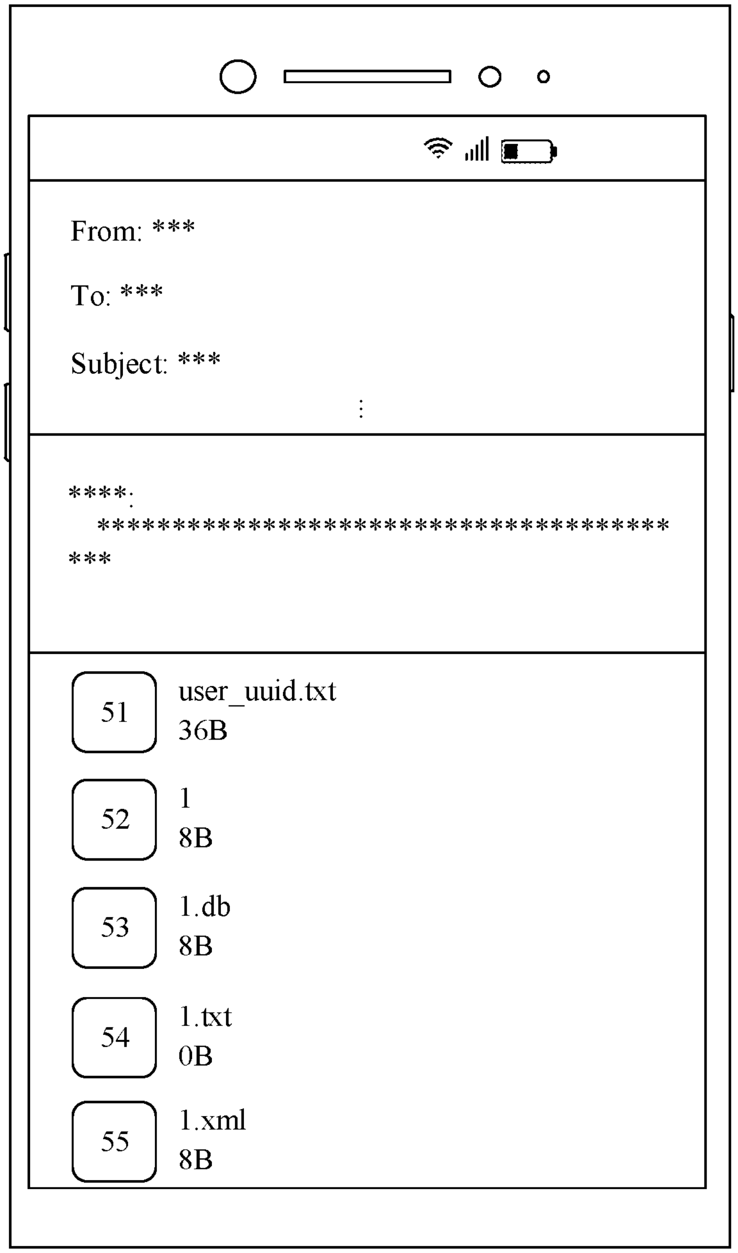
FIG. 5 is a schematic diagram of content of an email synchronized by using the conventional technology.

For example, after obtaining any to-be-synchronized email, the electronic device displays email content of the email in response to an operation that is entered by the user and that is of viewing the email. The email content of the email may include a message header, an email body, and a plurality of attachments. It is assumed that the electronic device is a mobile terminal using an Android (Android) operating system, and information of an attachment in the email fails to be downloaded. Refer to FIG. 5. The electronic device displays a recipient, a sender, a subject, and the like in a message header of an email, and further displays names and file sizes of a plurality of attachments, which specifically include: a first attachment 51 with a name of "user_uuid.txt" and a file size of 36 B, a second attachment 52 with a name of "1" and a file size of 8 B, a third attachment 53 with a name of "1.db" and a file size of 8 B, a fourth attachment 54 with a name of "1.txt" and a file size of OB, and a fifth attachment 55 with a name of "1.xml" and a file size of 8 B. It can be learned that information of the fourth attachment in the email fails to be downloaded.

It may be understood that, in the process in which the electronic device synchronizes the email by using the foregoing solution, the electronic device sends the request for the entire email to the server by using the email identifier of the to-be-synchronized email, to request, from the server, to obtain the entire email indicated by the email identifier. Only the information of each object can be extracted from the message body of the entire email, and information required for downloading each object is not available. In this case, if information of any object in the message body of the entire email fails to be downloaded, the request for the entire email can only be sent to the server again due to the lack of information required for downloading the object. Because the server has responded to the request for the entire email once, when receiving the request for the entire email again, the server sends, to the electronic device, the response indicating that the download is completed. The electronic device cannot obtain the information of the object from the response that is sent by the server and that indicates that the download is completed. In this case, the user can only re-log in to an account on the email client, to request, by using the email identifier, the server again to obtain the entire email (including the information of the object that fails to be downloaded) indicated by the email identifier, which increases complexity and traffic consumption of email synchronization. In addition, when the entire email is downloaded again, there is still a possibility that the information of the object fails to be downloaded, and a success rate of the email synchronization is low.

Therefore, embodiments of this application provide an email synchronization method, to improve a success rate of email synchronization, and reduce complexity and traffic consumption of the email synchronization.

It should be noted that all methods in the following embodiments may be implemented in the electronic device 200 having the foregoing hardware structure.

Figure 6:
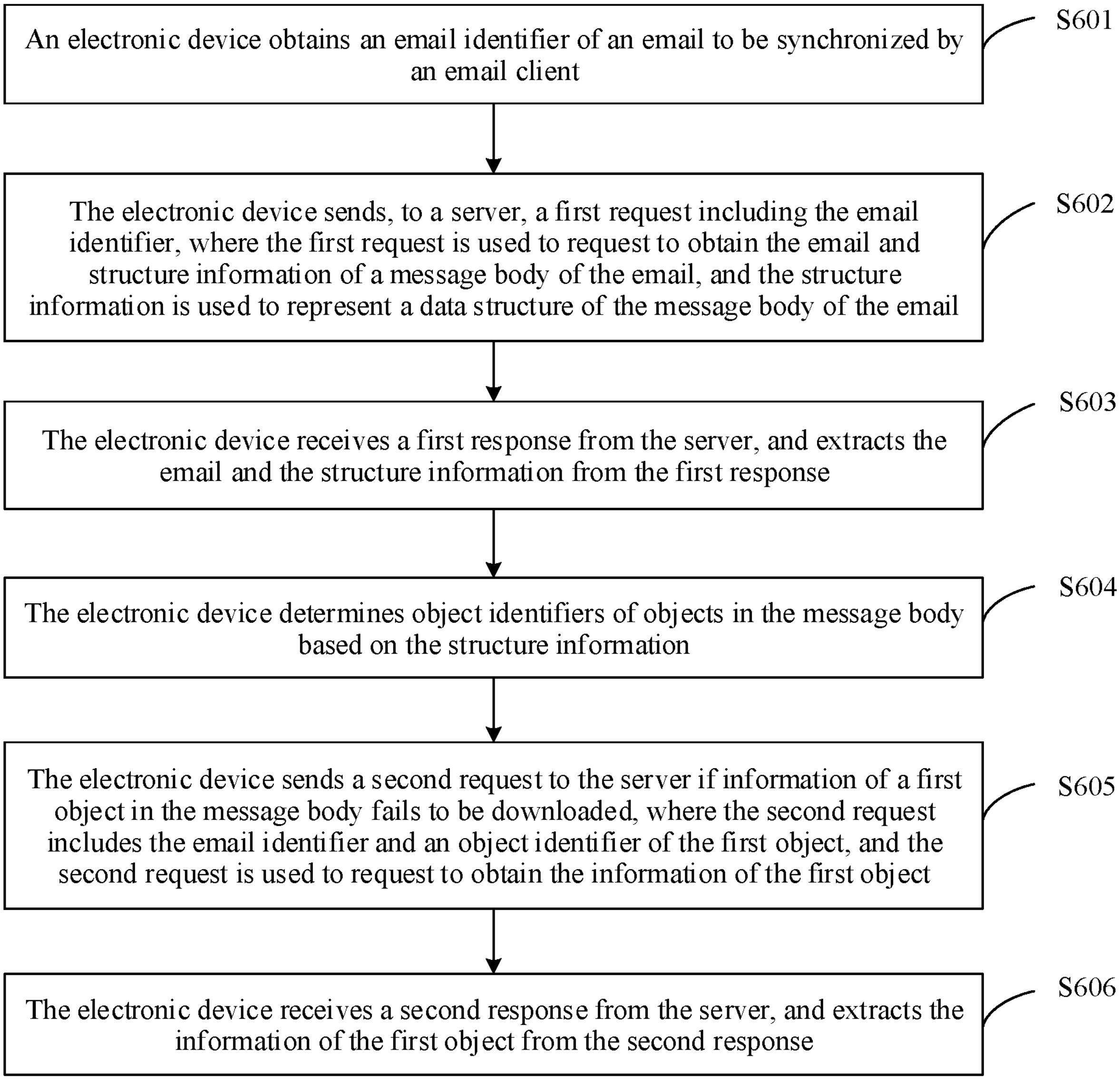
FIG. 6 is a flowchart 1 of an email synchronization method according to an embodiment of this application.

FIG. 6 is a flowchart of an email synchronization method according to an embodiment of this application, and this method is applied to an electronic device installed with an email client. As shown in FIG. 6, the method may include S601 to S606.

S601: The electronic device obtains an email identifier of an email to be synchronized by the email client.

When a user logs in to an account of the email client for the first time, the electronic device may automatically send a request for querying the email identifier of the to-be-synchronized email to a server, and then receive the email identifier of the to-be-synchronized email from the server. The to-be-synchronized email may be an email received by the account within preset duration. The preset duration refers to a period of time before a current moment, for example, one day, one week, or one month.

Alternatively, when an account is logged in to the email client, the electronic device may send, to the server based on a preset synchronization period, a request for querying the email identifier of the to-be-synchronized email, and then receive the email identifier of the to-be-synchronized email from the server. The to-be-synchronized email may be an email that is received by the account in a preset synchronization period and that is before a current moment and that is adjacent to the current moment. The preset synchronization period may be one day, one week, one month, or the like.

The user account may be an IMAP account. The email identifier of the to-be-synchronized email may include email identifiers of one or more emails. The electronic device synchronizes the email from the server by using the email identifier of each email, that is, performs S602 to S606 for each email.

S602: The electronic device sends, to a server, a first request including the email identifier, where the first request is used to request to obtain the email and structure information of a message body of the email, and the structure information is used to represent a data structure of the message body of the email.

The structure information is used to represent the data structure of the message body of the email, and the data structure is used to represent a sequence of objects in the message body of the email. The objects in the message body of the email include: an email body of the email, or the email body of the email and additional information of the email, and the additional information includes an embedded resource and/or an attachment.

In this embodiment of this application, the first request may not only include the email identifier, but also include a first parameter required for requesting the email (that is, the first parameter required for requesting an entire email) and a second parameter required for requesting the structure information of the message body of the email.

For example, if the email client on the electronic device synchronizes the email from the server by using an IMAP protocol, the first request may be generated based on a fetch instruction, the first parameter in the first request is BODY, and the second parameter in the first request is BODYSTRUCTURE. A format of the first request may be UID FETCH MESSAGE-ID (UID BODYSTRUCTURE BODY PEEK[ ]).

S603: The electronic device receives a first response from the server, and extracts the email and the structure information from the first response.

The server receives the first request and responds to the first request, generates the first response including the email and the structure information, and sends the first response to the electronic device. The electronic device receives the first response from the server, and extracts the email and the structure information from the first response.

S604: The electronic device determines object identifiers of the objects in the message body based on the structure information.

The electronic device determines the object identifiers of the objects in the message body of the email based on the sequence of the objects in the message body of the email. Object identifiers of different objects in the message body of the email are different.

In this embodiment of this application, the object in the message body of the email may include the email body, the embedded resource, and one or more attachments. The sequence of the objects in the message body of the email may be: the email body, the embedded resource, a first attachment, a second attachment, and the like. The email may set, based on the sequence of the objects in the message body of the email, the object identifiers of the objects in a manner of automatically increasing by 1 and starting from 1. For example, an object identifier of the email body is 1, an object identifier of the embedded resource is 2, an object identifier of the first attachment is 3, and an object identifier of the second attachment is 4.

For example, for an MIME email, an object in the MIME email may be a compound object (that is, a MimeMultipart object) formed by combining a plurality of objects. For objects in the compound object, the electronic device combines identifiers of the objects in the compound object based on an object identifier of the compound object and a sequence of the objects in the compound object. For example, a message body of the MIME email includes a compound object including an email body and an embedded resource, and an attachment. An object identifier of the compound object may be 1, an object identifier of the email body in the compound object is 1.1, an object identifier of the embedded resource in the compound object is 1.2, and an object identifier of the attachment is 2.

It should be noted that the message body of the email may include a single-layer nested compound object (that is, any object in the message body of the email is a compound object), and may further include a multi-layer nested compound object (that is, any object in the compound object is a compound object). An object identifier of any object in the multi-layer nested compound object is more complex, for example, 2.1.1.

S605: The electronic device sends a second request to the server if information of a first object in the message body fails to be downloaded, where the second request includes the email identifier and an object identifier of the first object, and the second request is used to request to obtain the information of the first object.

The first object is any object in the message body of the email.

In this embodiment of this application, the electronic device sequentially obtains information of the objects from the message body of the email, and determines whether the information of the objects is successfully downloaded. If the electronic device determines that the information of the first object fails to be downloaded, the electronic device sends the first request, to re-download the information of the first object. If the electronic device determines that the information of the first object is successfully downloaded, the electronic device stores the information of the first object locally or to a database.

For example, if the email client on the electronic device synchronizes the email from the server by using the IMAP protocol, the second request may be generated based on the fetch instruction, and a format of the second request may be UID FETCH MESSAGE-ID (UID BODY PEEK[partID]). The partID is the object identifier of the first object.

S606: The electronic device receives a second response from the server, and extracts the information of the first object from the second response.

The server receives the second request and responds to the second request, obtains the object identifier partID of the first object from the second request, then determines the information of the first object based on the object identifier partID of the first object, generates the second response including the information of the first object, and then sends the second response to the electronic device. The electronic device receives the second response from the server, and extracts the information of the first object from the second response, to complete re-downloading of the information of the first object.

The server may include the information of the objects corresponding to the object identifiers of the objects, and may determine the corresponding information of the first object by using the object identifier partID of the first object. The object identifiers of the objects in the server are the same as the object identifiers that are of the objects and that are determined by the electronic device.

It may be understood that the electronic device may send the first request to the server, to request, from the server, to obtain the email indicated by the email identifier and the structure information of the message body of the email. After sending the first request, the electronic device may receive the first response from the server, and the first response includes the email and the structure information of the message body of the email. In this way, the electronic device can not only obtain the entire email, that is, download all information of the email at a time, but also obtain the structure information of the message body of the email.

In this way, the electronic device may determine the object identifiers of the objects in the message body based on the structure information. In this way, when the information of the first object in the message body of the email fails to be downloaded, the electronic device may send, by using the object identifier of the first object, the second request for requesting the information of the first object to the server, to request to obtain the information of the first object from the server.

According to the foregoing solution, a problem that a part of the information cannot be re-downloaded when the part of the information of the electronic device fails to be downloaded because the electronic device downloads all the information of the email at a time can be resolved. According to the method in this application, the electronic device may re-download the information of the first object by using the object identifier of the first object that fails to be downloaded. Compared with a method of re-logging in to an account to resynchronize the email in the conventional technology, complexity of synchronizing the email by the electronic device can be reduced by using this solution. In addition, the electronic device re-downloads only the information of the first object that fails to be downloaded. Compared with re-downloading the entire email, traffic consumption of email synchronization is reduced.

In this embodiment of this application, if the electronic device determines that the information of the first object in the message body of the email fails to be downloaded, the electronic device may directly send the second request to the server, to request to obtain the information of the first object from the server. Then, the electronic device may extract the information of the first object from the second response returned by the server.

Figure 8A:
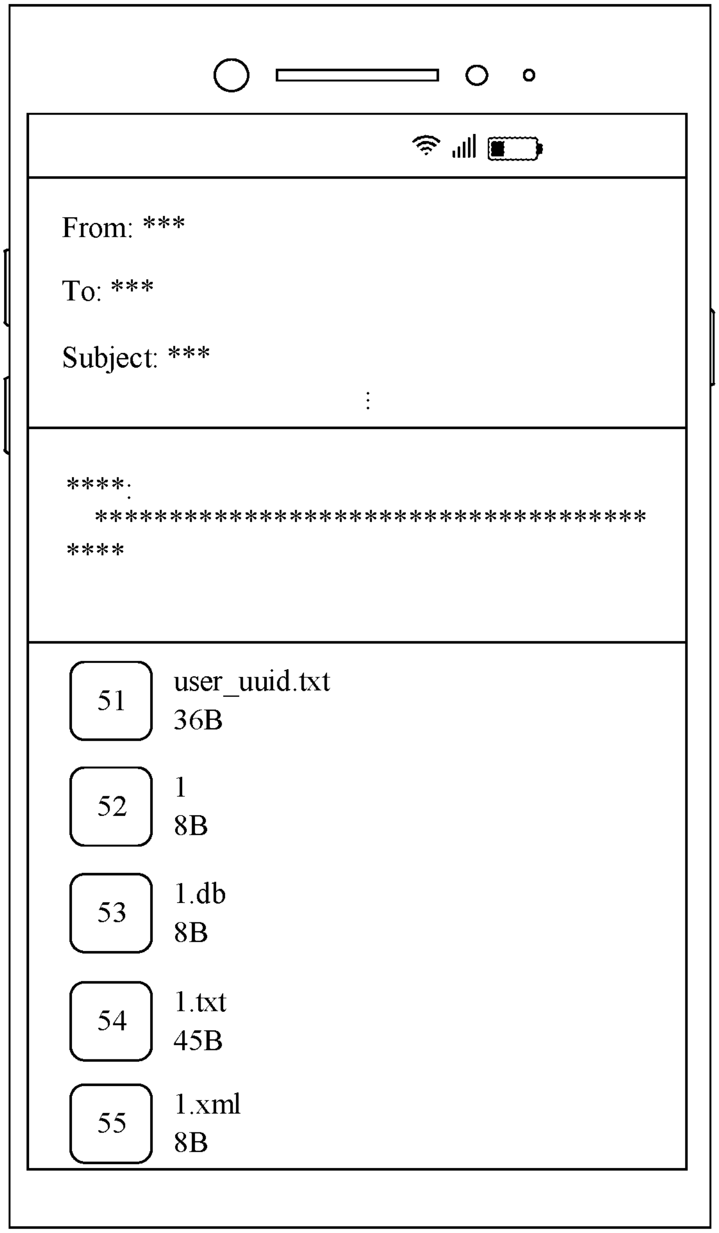
FIG. 8A is a schematic diagram of content of an email whose attachments are re-downloaded according to an embodiment of this application.

For example, the email in FIG. 5 is used as an example. If the electronic device determines that information of the fourth attachment 54 in a message body of the email fails to be downloaded, the electronic device directly sends a second request including an object identifier of the fourth attachment 54 to the server, to request to obtain the information of the fourth attachment 54 from the server. The electronic device may successfully extract the information of the fourth attachment 54 from a returned second response, and store the information. Then, if the electronic device responds to an operation that is entered by a user and that is of viewing the email, the electronic device displays email content of the email, including the information of the fourth attachment 54 that is successfully downloaded. As shown in FIG. 8A, by using the email synchronization method provided in this application, the electronic device can automatically re-download the information of the fourth attachment 54. In addition, if the electronic device successfully extracts the information of the fourth attachment 54 from the second response, the electronic device directly displays complete information of the fourth attachment 54 with a file size of 45 B. In this way, the information of the fourth attachment 54 is re-downloaded without being perceived by the user, and the fourth attachment 54 that is successfully downloaded is displayed to the user, so that use experience of the user is good.

It may be understood that, in the conventional technology, when determining that the information of the first object fails to be downloaded, the electronic device sends the request for the entire email to the server again, and then the server sends, to the electronic device again in response to the request for the entire email, the response indicating that the download is completed. In this way, the electronic device cannot obtain the information of the first object from the response indicating that the download is completed, and cannot automatically re-download the information of the first object. In the email synchronization method provided in this application, the electronic device sends the second request to the server by using the object identifier of the first object that fails to be downloaded, and then, in response to the second request, the server usually returns the information of the first object to the electronic device. In this way, according to the method in this application, the electronic device may automatically re-download the information of the first object. Compared with the conventional technology in which the electronic device re-sends the request for the entire email to the server, according to the method in this application, the information of the first object can be automatically re-downloaded, and a success rate of email synchronization is improved.

Figure 7:
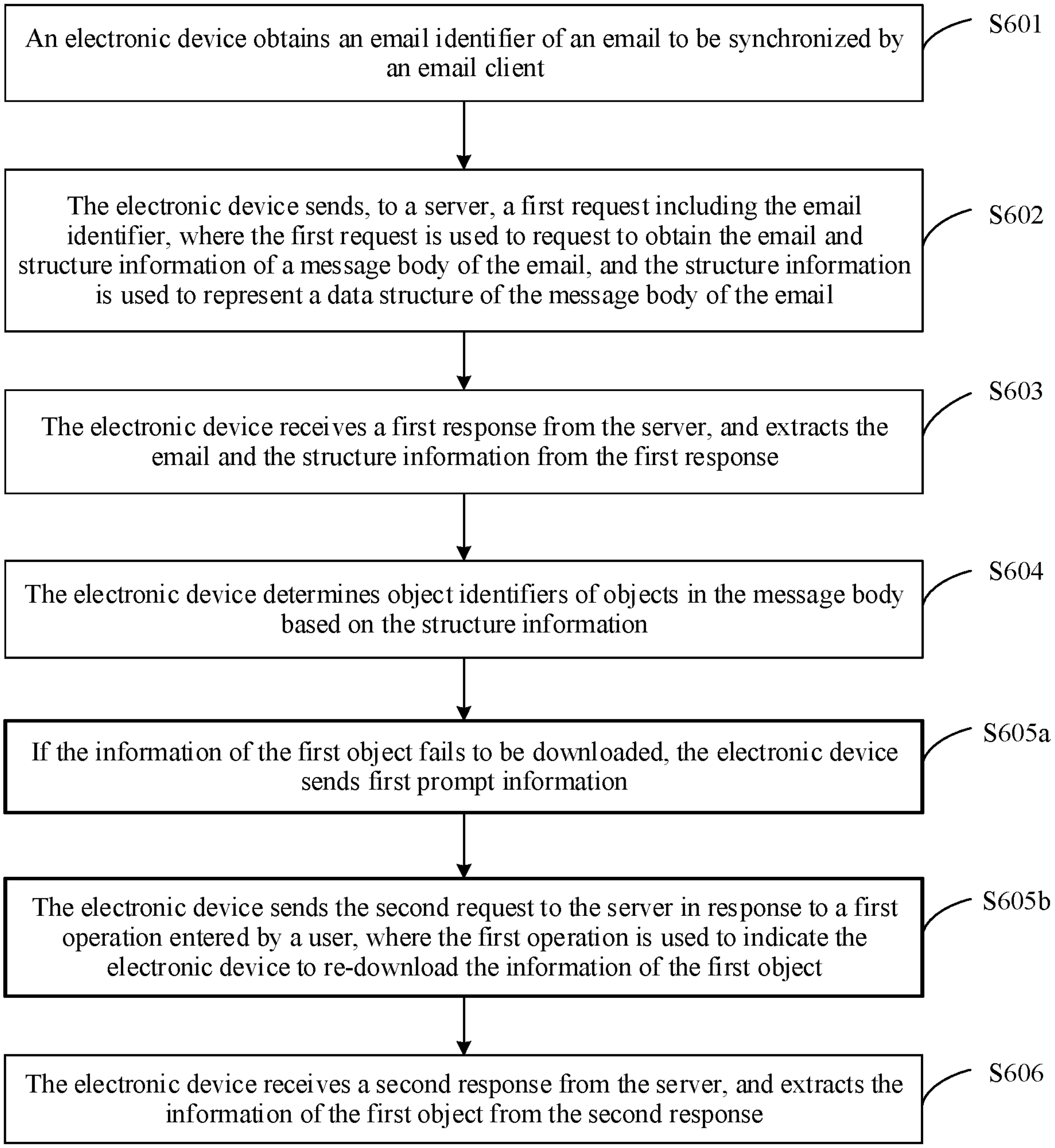
FIG. 7 is a flowchart 2 of an email synchronization method according to an embodiment of this application.

In this embodiment of this application, if the electronic device determines that the information of the first object in the message body of the email fails to be downloaded, the electronic device may not send the second request to the server first, but first notify the user, so that the user chooses whether to re-download the information of the first object. If the user chooses to re-download the information of the first object, the electronic device may send the second request to the server. Specifically, refer to FIG. 7. S605 may include S605*a* and S605*b*.

S605*a*: If the information of the first object fails to be downloaded, the electronic device sends first prompt information.

The first prompt information is used to indicate that the information of the first object fails to be downloaded, and the first prompt information is further used to request the user to check whether to re-download the information of the first object.

For example, the first prompt information may be a control that indicates that the information of the first object fails to be downloaded and that has a function of re-downloading the information of the first object. If the information of the first object fails to be downloaded, the electronic device displays the control. If the user triggers the control, the electronic device determines that the user needs to re-download the information of the first object, or if the user does not trigger the control, the electronic device determines that the user does not need to re-download the information of the first object.

For example, the first prompt information may be a voice or text, and the voice or the text includes at least one piece of the following content: content for prompting that the information of the first object fails to be downloaded, content for requesting the user to check whether to re-download the information of the first object, and content for indicating a re-download option. The re-download option has the function of re-downloading the information of the first object.

S605b: The electronic device sends the second request to the server in response to a first operation entered by the user, where the first operation is used to indicate the electronic device to re-download the information of the first object.

The electronic device receives the first operation entered by the user, responds to the first operation, and sends the second request to the server.

It should be noted that for detailed descriptions of the second request in S605b, refer to the descriptions of the second request in S605 in the foregoing embodiment. Details are not described herein in this embodiment of this application.

For example, if the first prompt information is the control, and the user triggers the control, the electronic device determines that the first operation is received.

For example, if the first prompt information is the voice or the text, the voice or the text includes the content for indicating the re-download option, and the user selects the re-download option, the electronic device determines that the first operation is received.

Figure 8B:
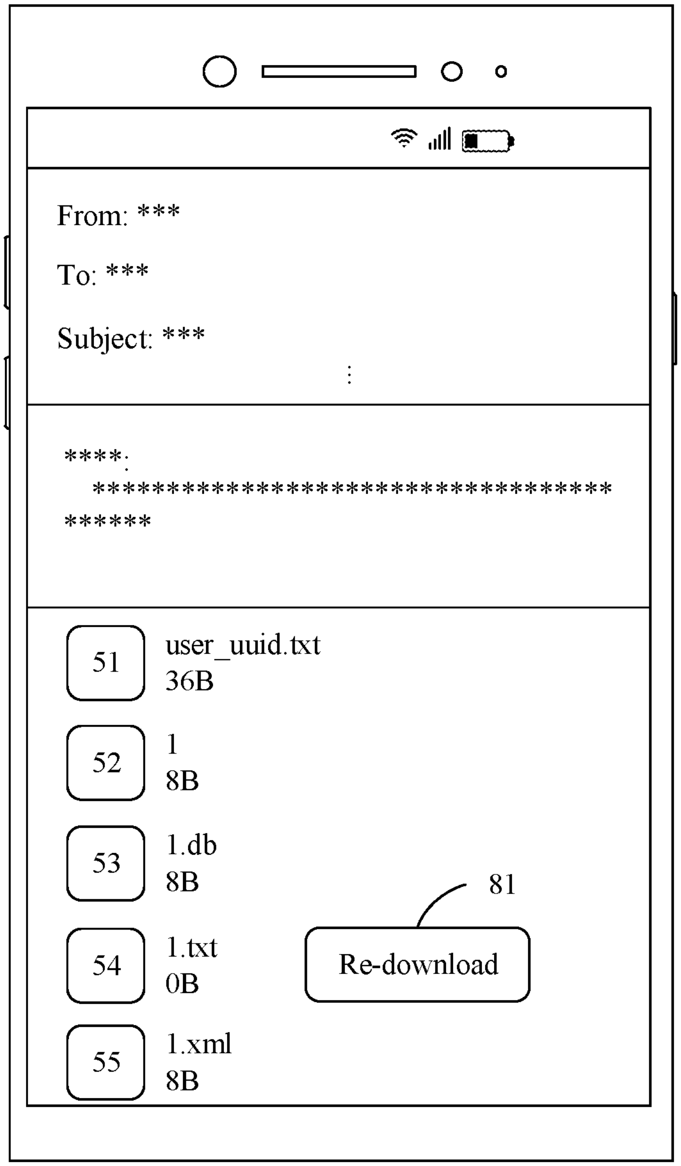
FIG. 8B is a schematic diagram 1 of content of an email whose attachment fails to be downloaded according to an embodiment of this application.

For example, the email in FIG. 5 is used as an example. If the electronic device determines that the information of the fourth attachment in the message body of the email fails to be downloaded, the electronic device sends the first prompt information. Then, the electronic device responds to the operation that is entered by the user and that is of viewing the email, and displays the email content of the email and the first prompt information. As shown in FIG. 8B, the electronic device displays the recipient, the sender, the subject, and the names and file sizes of the plurality of attachments in the email, and further displays first prompt information 81 corresponding to the fourth attachment. It can be seen from FIG. 8B that the file size of the fourth attachment 54 is OB, which indicates that the information of the fourth attachment 54 fails to be downloaded. The first prompt information 81 is a control named "Re-download". The first prompt information 81 is used to indicate that the information of the fourth attachment 54 fails to be downloaded, and is further used to request the user to check whether to re-download the information of the fourth attachment 54. If the user taps the control, the electronic device determines that the first operation entered by the user is received, and determines that the user needs to re-download the information of the fourth attachment 54. If the user does not tap the control, the electronic device determines that the user does not need to re-download the information of the fourth attachment 54. Further, if the electronic device receives the first operation entered by the user and responds to the first operation, the electronic device sends the second request to the server, where the first operation is used to indicate the electronic device to re-download the information of the fourth attachment 54. If the electronic device successfully extracts the information of the fourth attachment from the second response sent by the server, the electronic device stores the successfully extracted information of the fourth attachment, updates a page, and displays, to the user, complete information of the fourth attachment with the file size of 45 B, as shown in FIG. 8A.

Figure 8C:
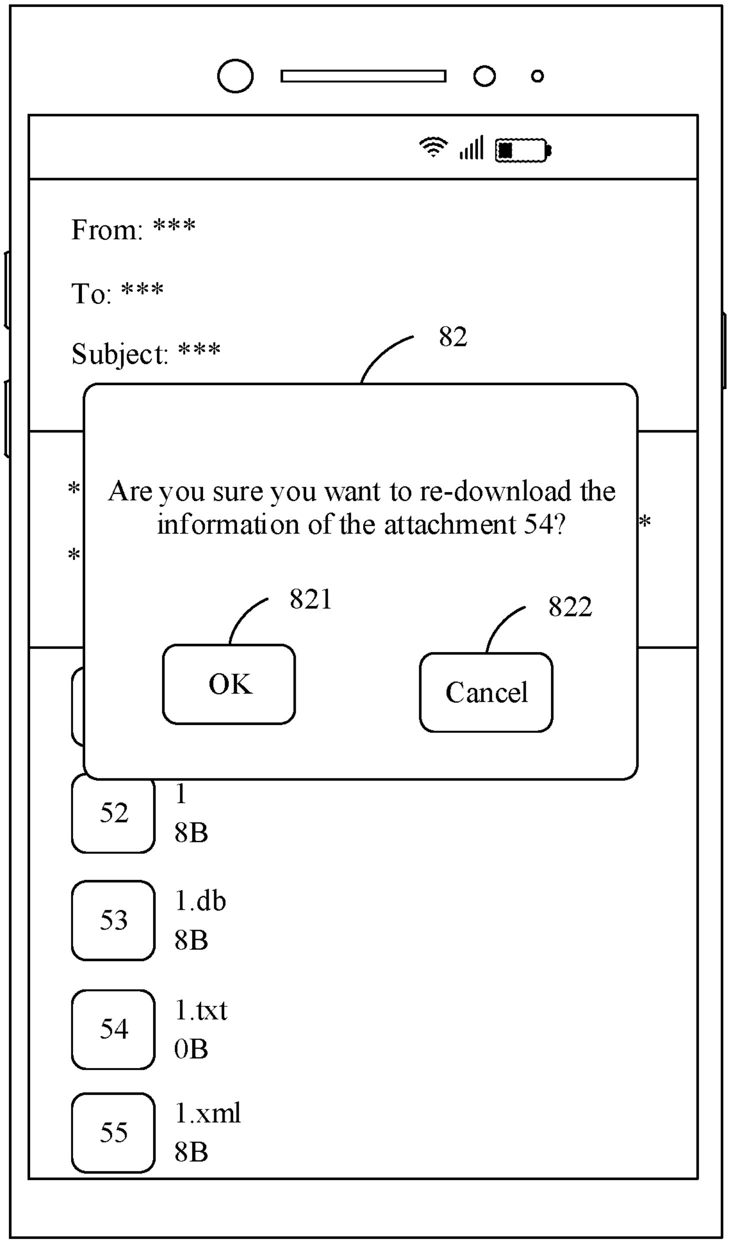
FIG. 8C is a schematic diagram 2 of content of an email whose attachment fails to be downloaded according to an embodiment of this application.

For example, the email in FIG. 5 is still used as an example. As shown in FIG. 8C, if the electronic device determines that the information of the fourth attachment in the message body of the email fails to be downloaded, the electronic device sends first prompt information 82. Then, the electronic device responds to the operation that is entered by the user and that is of viewing the email, and displays the email content of the email and the first prompt information 82. The first prompt information 82 includes content "Are you sure you want to re-download the information of the attachment 54?", an OK option 821, and a Cancel option 822. If the user taps the OK option 821, the electronic device determines that the first operation entered by the user is received, and determines that the user needs to re-download the information of the fourth attachment 54. If the user taps the Cancel option 822, the electronic device determines that the user does not need to re-download the information of the fourth attachment 54. Further, if the electronic device receives the first operation entered by the user and responds to the first operation, the electronic device sends the second request to the server, where the first operation is used to indicate the electronic device to re-download the information of the fourth attachment 54. If the electronic device successfully extracts the information of the fourth attachment from the second response sent by the server, the electronic device stores the successfully extracted information of the fourth attachment, updates the page, and displays, to the user, complete information of the fourth attachment with the file size of 45 B, as shown in FIG. 8A.

It may be understood that, if the electronic device determines that the information of the first object in the message body of the email fails to be downloaded, the electronic device may first send the first prompt information, to notify the user that the information of the first object fails to be downloaded, so that the user chooses whether to re-download the information of the first object. When the user chooses to re-download the information of the first object, the electronic device sends, to the server, the second request used to request to obtain the information of the first object. In this way, based on an actual requirement of the user, the information of the first object that fails to be downloaded may be re-downloaded only for the email required by the user. Compared with re-downloading all information of all to-be-synchronized emails, traffic consumption of email synchronization is reduced.

Figure 9:
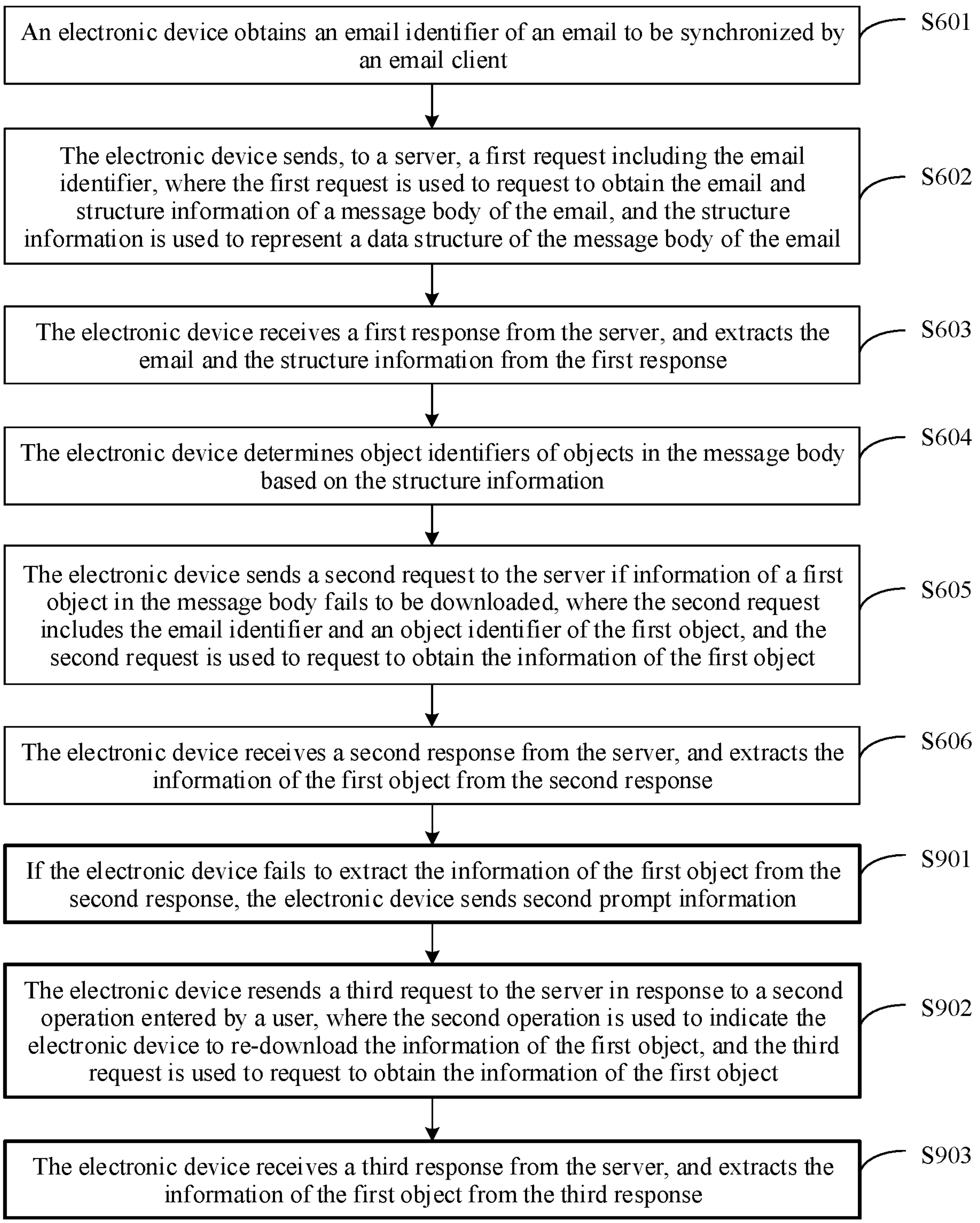
FIG. 9 is a flowchart 3 of an email synchronization method according to an embodiment of this application.

In this embodiment of this application, after the electronic device automatically re-downloads the information of the first object by using the second request, if the information of the first object fails to be downloaded again, the electronic device may notify the user, so that the user chooses whether to continue to re-download the information of the first object. Specifically, refer to FIG. 9. The email synchronization method may further include S901 to S903 after S606.

S901: If the electronic device fails to extract the information of the first object from the second response, the electronic device sends second prompt information.

The second prompt information is used to indicate that the information of the first object fails to be downloaded, and the second prompt information is further used to request the user to check whether to re-download the information of the first object.

It should be noted that for detailed descriptions of the second prompt information, refer to the detailed descriptions of the first prompt information. Details are not described herein in this embodiment of this application. The second prompt information and the first prompt information may be the same, or may be different.

S902: The electronic device resends a third request to the server in response to a second operation entered by the user, where the second operation is used to indicate the electronic device to re-download the information of the first object, and the third request is used to request to obtain the information of the first object.

It should be noted that for detailed descriptions of the third request in S902, refer to the descriptions of the second request in S605 in the foregoing embodiment. Details are not described herein in this embodiment of this application.

S903: The electronic device receives a third response from the server, and extracts the information of the first object from the third response.

Further, after the electronic device extracts the information of the first object from the third response, if the electronic device determines that the information of the first object fails to be downloaded, the electronic device may continue to perform S901 to S903. If the electronic device determines that the information of the first object is successfully downloaded, the electronic device no longer sends the second prompt information, and may send prompt information indicating that the download succeeds.

It should be noted that for detailed descriptions of the third response in S902, refer to the descriptions of the second response in S606 in the foregoing embodiment. For detailed descriptions of S903, refer to the specific descriptions of S606. Details are not described herein in this embodiment of this application.

It may be understood that, after automatically re-downloading the information of the first object, the electronic device sends the second prompt information if the information of the first object fails to be downloaded again. In addition to notifying the user that the information of the first object fails to be downloaded, the second prompt information is further used to request the user to check whether to re-download the information of the first object; that is, provides the user with an entry for continuing to re-download the information of the first object. Further, the user may manually control to continue to re-download the information of the first object, or may further control to continue to re-download the information of the first object in a proper case such as a stable communication network. Compared with a method of re-logging in to an account to resynchronize the email, complexity of email synchronization is reduced, and a success rate of the email synchronization is improved.

Figure 10A:
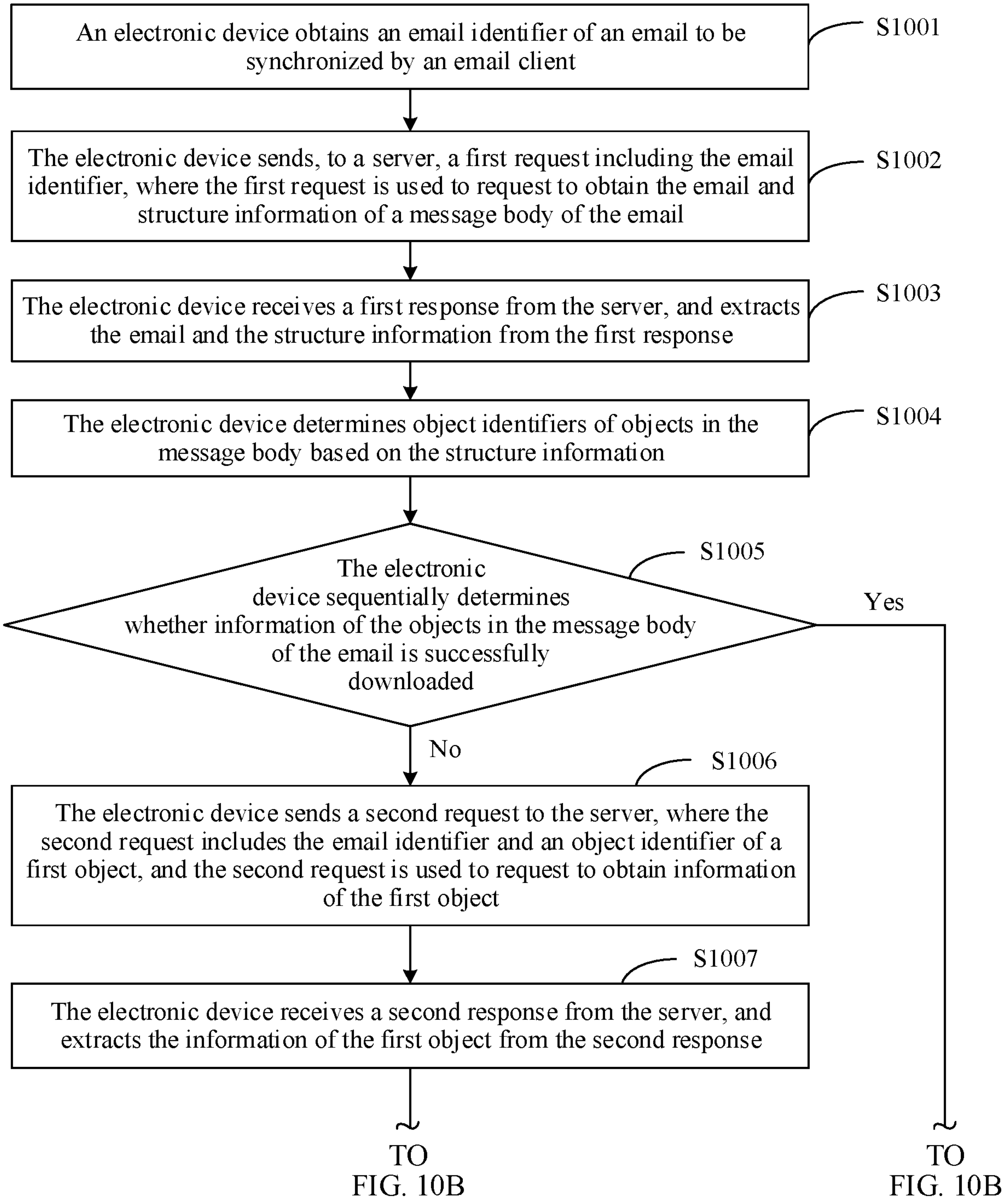
FIG. 10A and FIG. 10B are a flowchart 4 of an email synchronization method according to an embodiment of this application.
Figure 10B:
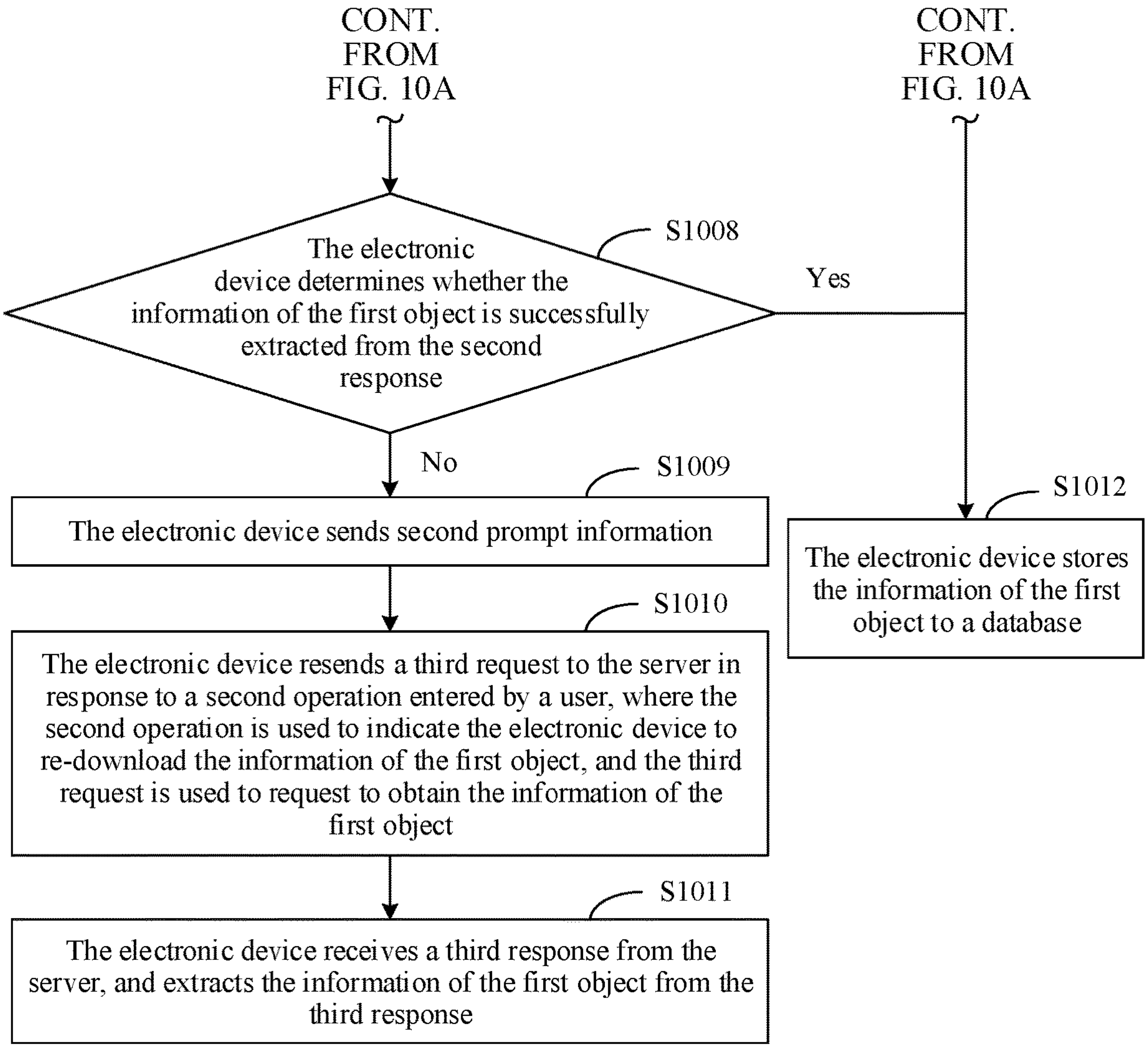

In this embodiment of this application, after determining that the information of the first object fails to be downloaded, the electronic device re-downloads the information of the first object, and determines whether the information of the first object is successfully downloaded. If the information of the first object fails to be downloaded, the electronic device sends the second prompt information. If the information of the first object is successfully downloaded, the electronic device stores the information of the first object locally or to a database. After the electronic device sends the second prompt information, if the electronic device receives the second operation entered by the user, the electronic device continues to re-download the information of the first object. Specifically, refer to FIG. 10A and FIG. 10B. An electronic device performs an email synchronization method according to an embodiment of this application, and the method includes S1001 to S1012.

S1001: The electronic device obtains an email identifier of an email to be synchronized by an email client.

S1002: The electronic device sends, to a server, a first request including the email identifier, where the first request is used to request to obtain the email and structure information of a message body of the email.

The structure information is used to represent a data structure of the message body of the email.

S1003: The electronic device receives a first response from the server, and extracts the email and the structure information from the first response.

S1004: The electronic device determines object identifiers of objects in the message body based on the structure information.

It should be noted that for a specific process of S1001 to S1004, refer to the detailed descriptions of S601 to S604. Details are not described herein in this embodiment of this application.

S1005: The electronic device sequentially determines whether information of the objects in the message body of the email is successfully downloaded.

The electronic device sequentially obtains the information of the objects from the message body of the email, and determines whether the information of the objects is successfully downloaded. If the electronic device determines that information of a first object fails to be downloaded, the electronic device performs S1006. If the electronic device determines that the information of the first object is successfully downloaded, the electronic device performs S1012.

S1006: The electronic device sends a second request to the server, where the second request includes the email identifier and an object identifier of the first object, and the second request is used to request to obtain the information of the first object.

The first object is any object in the message body of the email.

S1007: The electronic device receives a second response from the server, and extracts the information of the first object from the second response.

It should be noted that for a specific process of S1006 and S1007, refer to the detailed descriptions of S605 and S606. Details are not described herein in this embodiment of this application.

S1008: The electronic device determines whether the information of the first object is successfully extracted from the second response.

If the electronic device determines that the information of the first object fails to be extracted from the second response (that is, the information of the first object fails to be downloaded), the electronic device performs S1009. If the electronic device determines that the information of the first object is successfully extracted from the second response (that is, the information of the first object is successfully downloaded), the electronic device performs S1012.

S1009: The electronic device sends second prompt information.

S1010: The electronic device resends a third request to the server in response to a second operation entered by a user, where the second operation is used to indicate the electronic device to re-download the information of the first object, and the third request is used to request to obtain the information of the first object.

S1011: The electronic device receives a third response from the server, and extracts the information of the first object from the third response.

It should be noted that for a specific process of S1009 to S1011, refer to the detailed descriptions of S901 to S903. Details are not described herein in this embodiment of this application.

S1012: The electronic device stores the information of the first object to a database.

It may be understood that the electronic device may send the first request to the server, to request, from the server, to obtain the email indicated by the email identifier and the structure information of the message body of the email. After sending the first request, the electronic device may receive the first response from the server, and the first response includes the email and the structure information of the message body of the email. In this way, the electronic device can not only obtain the entire email, that is, download all information of the email at a time, but also obtain the structure information of the message body of the email.

In this way, the electronic device may determine the object identifiers of the objects in the message body of the email based on the structure information of the message body of the email. Further, if the electronic device determines that the information of the first object in the message body of the email fails to be downloaded, the electronic device may re-download the information of the first object for a plurality of times by using the object identifier of the first object, until the information of the first object is successfully downloaded. Compared with a method of re-logging in to an account to re-download the entire email, the method provided in this application reduces complexity and traffic consumption of email synchronization.

Figure 11A:
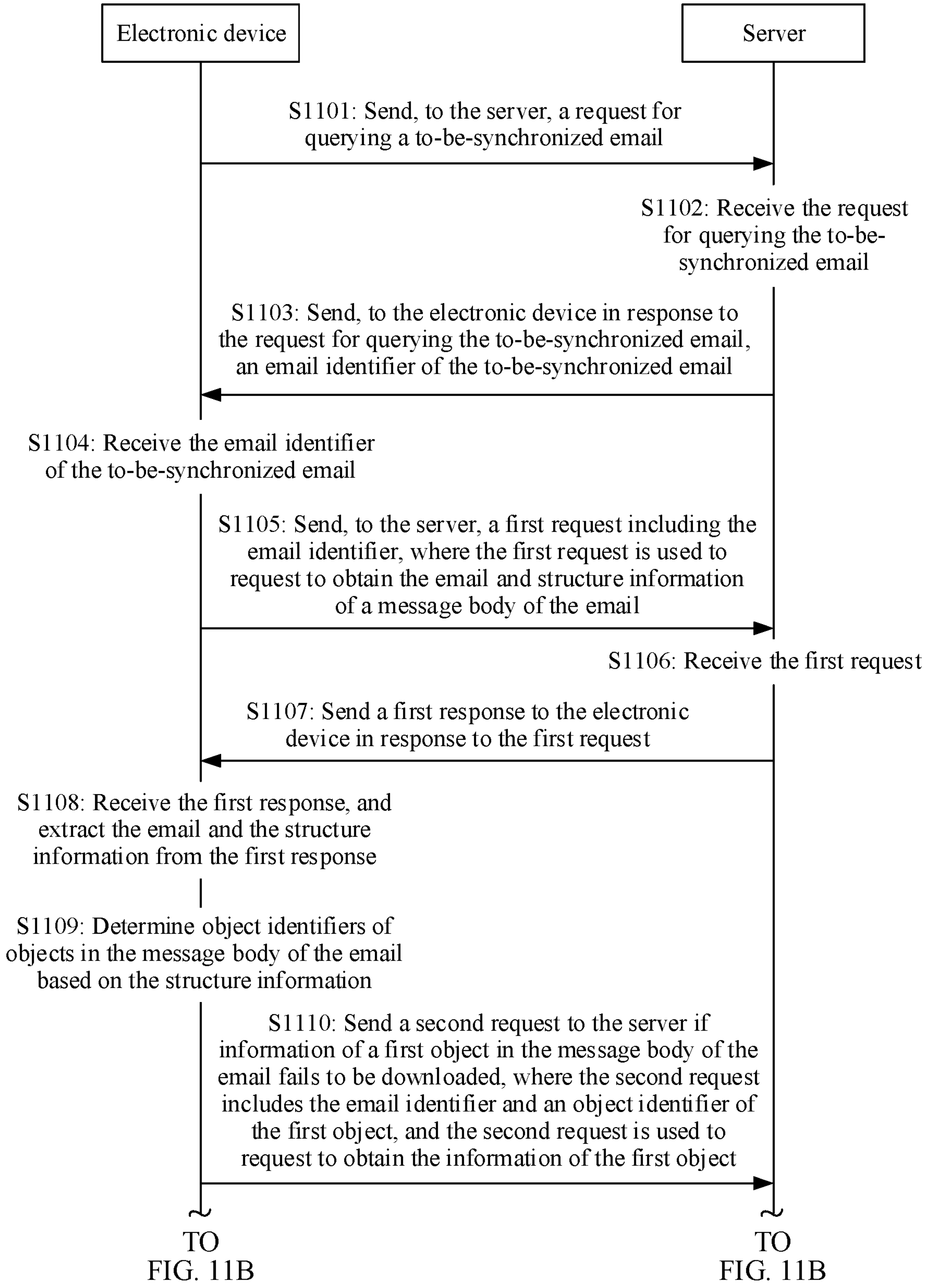
FIG. 11A and FIG. 11B are a flowchart 5 of an email synchronization method according to an embodiment of this application.
Figure 11B:
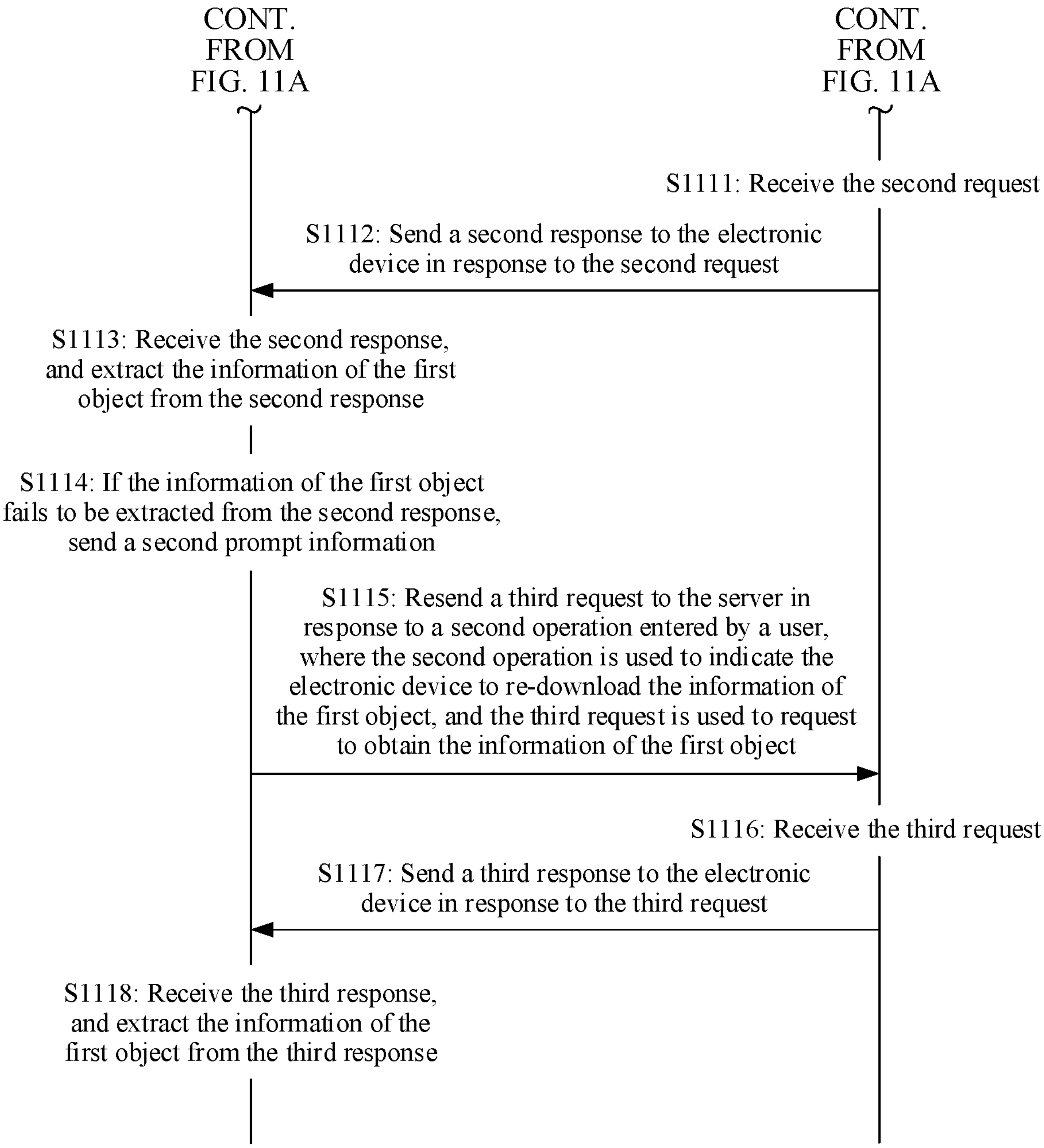

In this embodiment of this application, refer to FIG. 11A and FIG. 11B. An electronic device and a server perform an email synchronization method according to an embodiment of this application, and the method specifically includes S1101 to S1118.

S1101: The electronic device sends, to the server, a request for querying a to-be-synchronized email.

When a user logs in to an account of an email client for the first time, the electronic device may send a request for querying the to-be-synchronized email to the server, or send, to the server based on a preset synchronization period, a request for querying an email identifier of the to-be-synchronized email.

S1102: The server receives the request for querying the to-be-synchronized email.

S1103: The server sends, to the electronic device in response to the request for querying the to-be-synchronized email, the email identifier of the to-be-synchronized email.

In response to the request for querying the to-be-synchronized email, the server uses, based on preset duration, an email received by the account within the preset duration as the email identifier of the to-be-synchronized email, and sends the email identifier of the to-be-synchronized email to the electronic device. Alternatively, the server uses, based on a preset synchronization period, an email that is received by the account in a preset synchronization period and that is before a current moment and that is adjacent to the current moment as the email identifier of the to-be-synchronized email, and sends the email identifier of the to-be-synchronized email to the electronic device. For the preset duration and the preset synchronization period, refer to the detailed descriptions of the preset duration and the preset synchronization period in S601.

S1104: The electronic device obtains the email identifier of the to-be-synchronized email.

The email identifier of the to-be-synchronized email may include email identifiers of one or more emails. The electronic device synchronizes the email from the server by using the email identifier of each email, that is, performs S1105 to S1118 for each email.

S1105: The electronic device sends, to the server, a first request including the email identifier, where the first request is used to request to obtain the email and structure information of a message body of the email.

The structure information is used to represent a data structure of the message body of the email.

S1106: The server receives the first request.

S1107: The server sends a first response to the electronic device in response to the first request.

In response to the first request, the server generates the first response including the email and the structure information of the message body of the email, and then sends the first response to the electronic device.

S1108: The electronic device receives the first response, and extracts the email and the structure information from the first response.

S1109: The electronic device determines object identifiers of objects in the message body of the email based on the structure information.

S1110: The electronic device sends a second request to the server if information of a first object in the message body of the email fails to be downloaded, where the second request includes the email identifier and an object identifier of the first object, and the second request is used to request to obtain the information of the first object.

The first object is any object in the message body of the email.

S1111: The server receives the second request.

S1112: The server sends a second response to the electronic device in response to the second request.

In response to the second request, the server generates the second response including the information of the first object, and then sends the second response to the electronic device.

S1113: The electronic device receives the second response, and extracts the information of the first object from the second response.

S1114: If the electronic device fails to extract the information of the first object from the second response, the electronic device sends second prompt information.

S1115: The electronic device resends a third request to the server in response to a second operation entered by the user, where the second operation is used to indicate the electronic device to re-download the information of the first object, and the third request is used to request to obtain the information of the first object.

S1116: The server receives the third request.

S1117: The server sends a third response to the electronic device in response to the third request.

S1118: The electronic device receives the third response, and extracts the information of the first object from the third response.

It may be understood that the foregoing method may be implemented by an email synchronization apparatus. To implement the foregoing functions, the email synchronization apparatus includes a corresponding hardware structure and/or a software module for performing the functions. A person skilled in the art should be easily aware that, units and algorithm steps in the examples described with reference to embodiments disclosed in this specification can be implemented by hardware or a combination of hardware and computer software in embodiments of this application.

Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the email synchronization apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division in an actual implementation.

Figure 12:
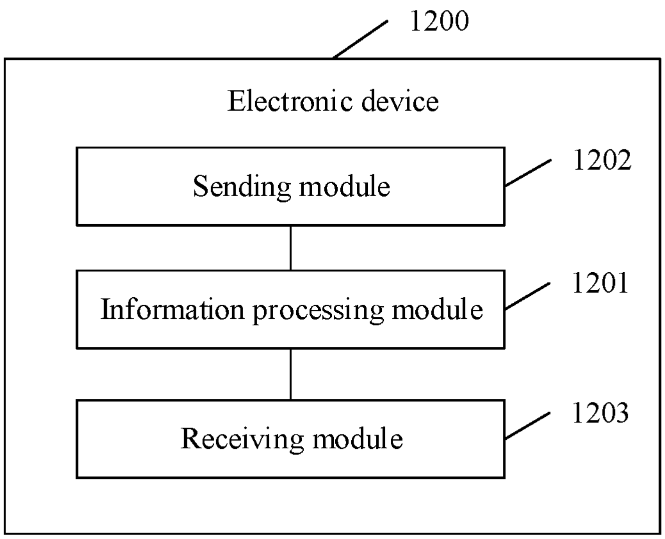
FIG. 12 is a schematic diagram 1 of a structure of an electronic device according to an embodiment of this application.

When each functional module is obtained through division based on each corresponding function, FIG. 12 is a schematic diagram of a possible structure of an electronic device in the foregoing embodiments. An electronic device 1200 is installed with an email client, and the electronic device 1200 includes an information processing module 1201, a sending module 1202, and a receiving module 1203. The information processing module 1201 is configured to obtain an email identifier of an email to be synchronized by the email client, the sending module 1202 is configured to send a first request including the email identifier to a server, and the receiving module 1203 is configured to receive a first response from the server. The information processing module 1201 is further configured to extract the email and structure information from the first response and determine object identifiers of objects in a message body based on the structure information, the sending module 1202 is configured to send a second request to the server if information of a first object in the message body fails to be downloaded, the receiving module 1203 is further configured to receive a second response from the server, and the information processing module 1201 is further configured to extract the information of the first object from the second response.

The first request is used to request to obtain the email and the structure information of the message body of the email, and the structure information is used to represent a data structure of the message body of the email. The objects in the message body include: an email body of the email, or the email body of the email and additional information of the email, and the additional information includes an embedded resource and/or an attachment. The second request includes the email identifier and an object identifier of the first object, and the second request is used to request to obtain the information of the first object.

In a possible implementation, the information processing module 1201 is further configured to send first prompt information if the information of the first object fails to be downloaded, and the sending module 1202 is configured to send the second request to the server in response to a first operation entered by a user. The first prompt information is used to indicate that the information of the first object fails to be downloaded, and the first prompt information is further used to request the user to check whether to re-download the information of the first object. The first operation is used to indicate the electronic device to re-download the information of the first object.

In another possible implementation, the information processing module 1201 is further configured to send second prompt information if the information of the first object fails to be extracted from the second response, the sending module 1202 is further configured to resend a third request to the server in response to a second operation entered by the user, the receiving module 1203 is further configured to receive a third response, and the information processing module 1201 is further configured to extract the information of the first object from the third response. The second prompt information is used to indicate that the information of the first object fails to be downloaded, and the second prompt information is further used to request the user to check whether to re-download the information of the first object. The second operation is used to indicate the electronic device to re-download the information of the first object, and the third request is used to request to obtain the information of the first object.

In another possible implementation, the structure information is used to represent the data structure of the message body of the email, and the data structure is used to represent a sequence of the objects in the message body. The information processing module 1201 is specifically configured to determine, by the electronic device, the object identifiers of the objects in the message body based on the sequence of the objects in the message body.

Figure 13:
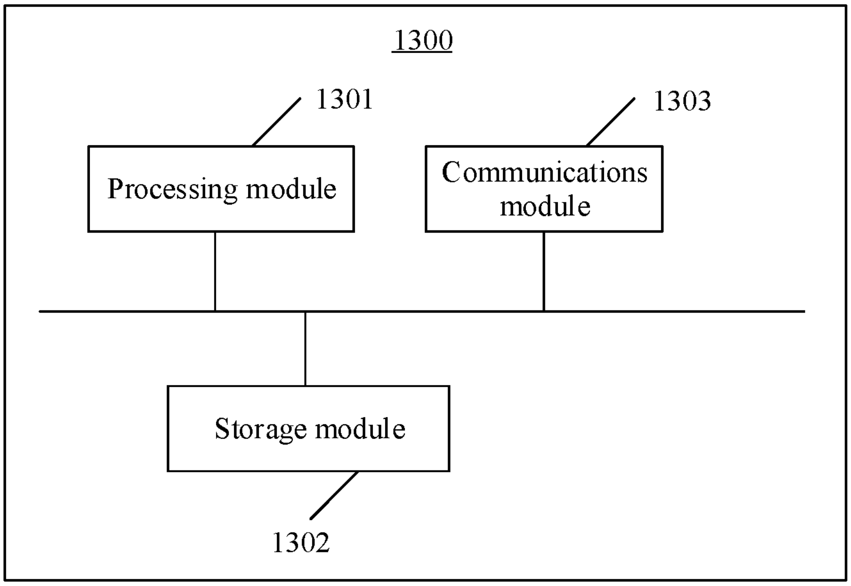
FIG. 13 is a schematic diagram 2 of a structure of an electronic device according to an embodiment of this application.

When an integrated unit is used, the sending module 1202 and the receiving module 1203 may be implemented by a communications module of the electronic device 1200. FIG. 13 is a schematic diagram of another possible structure of an electronic device in the foregoing embodiments. An electronic device 1300 includes a processing module 1301, a storage module 1302, and a communications module 1303.

The processing module 1301 is configured to control and manage the electronic device 1300. The storage module 1302 is configured to store program code and data of the electronic device 1300. The communications module 1303 is configured to communicate with another device. For example, the communications module 1303 is configured to receive data sent by the another device or send data to the another device.

The processing module 1301 may be a processor or a controller, for example, may be a CPU, a general-purpose processor, a DSP, an ASIC, an FPGA, or another programmable logic device, a transistor logic device, a hardware component, or any combination thereof. The processing module 1301 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 1303 may be a transceiver, a transceiver circuit, a communications interface, or the like. The storage module 1302 may be a memory. The processor, the communications interface, and the memory may be coupled together through a bus.

An embodiment of this application further provides a computer-readable storage medium. The computer-readable storage medium stores computer instructions. When the computer instructions are run on an electronic device, the electronic device is enabled to perform the functions or the steps in the foregoing method embodiments. For example, the computer-readable storage medium may be a read-only memory (Read-Only Memory, ROM), a random access memory (Random Access Memory, RAM), a compact disc read-only memory (Compact Disc Read-Only Memory, CD-ROM), a tape, a floppy disk, an optical data storage device, or the like.

An embodiment of this application further provides a computer program product. When the computer program product runs on the electronic device, the electronic device is enabled to perform the functions or the steps in the foregoing method embodiments.

The foregoing descriptions about implementations allow a person skilled in the art to clearly understand that, for the purpose of convenient and brief description, division of the foregoing functional modules is used as an example for description. During actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An email synchronization method, applied to an electronic device installed with an email client, wherein the method comprises:
- obtaining, by the electronic device, an email identifier of an email to be synchronized by the email client;
- sending, by the electronic device to a server, a first request comprising the email identifier, wherein the first request is used to request to obtain the email and structure information of a message body of the email, and the structure information is used to represent a data structure of the message body of the email;
- receiving, by the electronic device, a first response from the server;
- extracting, by the electronic device, the email and the structure information from the first response;
- determining, by the electronic device, object identifiers of objects in the message body based on the structure information, wherein the objects in the message body comprise an email body of the email, or the email body of the email and additional information of the email, and wherein the additional information comprises at least one of an embedded resource or an attachment;
- obtaining, by the electronic device, information of the objects in the message body;
- determining, by the electronic device, that information of a first object fails to be downloaded, wherein the first object is one of the objects in the message body;
- sending, by the electronic device, a second request to the server in response to determining that the information of the first object fails to be downloaded, wherein the second request comprises the email identifier and an object identifier of the first object, and the second request is used to request to obtain the information of the first object;
- receiving, by the electronic device, a second response from the server; and
- extracting, by the electronic device, the information of the first object from the second response.

2. The method according to claim 1, wherein the sending, by the electronic device, a second request to the server if information of a first object in the message body fails to be downloaded comprises:
- sending, by the electronic device, first prompt information if the information of the first object fails to be downloaded, wherein the first prompt information is used to indicate that the information of the first object fails to be downloaded, and the first prompt information is further used to request a user to check whether to re-download the information of the first object; and
- sending, by the electronic device, the second request to the server in response to a first operation entered by the user, wherein the first operation is used to indicate the electronic device to re-download the information of the first object.

3. The method according to claim 1, wherein after the extracting the information of the first object from the second response, the method further comprises:
- sending, by the electronic device, second prompt information if the information of the first object fails to be extracted from the second response, wherein the second prompt information is used to indicate that the information of the first object fails to be downloaded, and the second prompt information is further used to request a user to check whether to re-download the information of the first object;

sending, by the electronic device, a third request to the server in response to a second operation entered by the user, wherein the second operation is used to indicate the electronic device to re-download the information of the first object, and the third request is used to request to obtain the information of the first object;

receiving, by the electronic device, a third response from the server; and extracting, by the electronic device, the information of the first object from the third response.

4. The method according to claim 1, wherein the structure information is used to represent the data structure of the message body of the email, the data structure is used to represent a sequence of the objects in the message body, and the determining, by the electronic device, object identifiers of objects in the message body based on the structure information comprises:

determining, by the electronic device, the object identifiers of the objects in the message body based on the sequence of the objects in the message body.

5. An electronic device, comprising:

one or more processors; and one or more memories coupled to the one or more processors and storing programming instructions which, when executed by the one or more processors, cause the electronic device to perform operations comprising:

obtaining an email identifier of an email to be synchronized by an email client installed on the electronic device;

sending, to a server, a first request comprising the email identifier, wherein the first request is used to request to obtain the email and structure information of a message body of the email, and the structure information is used to represent a data structure of the message body of the email;

receiving a first response from the server;

extracting the email and the structure information from the first response;

determining object identifiers of objects in the message body based on the structure information, wherein the objects in the message body comprise an email body of the email, or the email body of the email and additional information of the email, and wherein the additional information comprises at least one of an embedded resource or an attachment;

obtaining information of the objects in the message body;

determining that information of a first object fails to be downloaded, wherein the first object is one of the objects in the message body;

sending a second request to the server in response to determining that the information of the first object fails to be downloaded, wherein the second request comprises the email identifier and an object identifier of the first object, and the second request is used to request to obtain the information of the first object;

receiving a second response from the server; and extracting the information of the first object from the second response.

6. The electronic device according to claim 5, wherein the operations further comprise:

sending, by the electronic device, first prompt information if the information of the first object fails to be downloaded, wherein the first prompt information is used to indicate that the information of the first object fails to be downloaded, and the first prompt information is further used to request a user to check whether to re-download the information of the first object; and sending, by the electronic device, the second request to the server in response to a first operation entered by the user, wherein the first operation is used to indicate the electronic device to re-download the information of the first object.

7. The electronic device according to claim 5, wherein the operations further comprise:

sending, by the electronic device, second prompt information if the information of the first object fails to be extracted from the second response, wherein the second prompt information is used to indicate that the information of the first object fails to be downloaded, and the second prompt information is further used to request a user to check whether to re-download the information of the first object;

sending, by the electronic device, a third request to the server in response to a second operation entered by the user, wherein the second operation is used to indicate the electronic device to re-download the information of the first object, and the third request is used to request to obtain the information of the first object;

receiving, by the electronic device, a third response from the server; and extracting, by the electronic device, the information of the first object from the third response.

8. The electronic device according to claim 5, wherein the structure information is used to represent the data structure of the message body of the email, the data structure is used to represent a sequence of the objects in the message body, and the operations further comprise:

determining, by the electronic device, the object identifiers of the objects in the message body based on the sequence of the objects in the message body.

9. A non-transitory computer-readable storage medium, comprising computer-readable instructions, wherein the computer-readable instructions, when executed by one or more processors of an electronic device, cause the electronic device to perform operations comprising:

obtaining an email identifier of an email to be synchronized by an email client installed on the electronic device;

sending, to a server, a first request comprising the email identifier, wherein the first request is used to request to obtain the email and structure information of a message body of the email, and the structure information is used to represent a data structure of the message body of the email;

receiving a first response from the server;

extracting the email and the structure information from the first response;

determining object identifiers of objects in the message body based on the structure information, wherein the objects in the message body comprise an email body of the email, or the email body of the email and additional information of the email, and wherein the additional information comprises at least one of an embedded resource or an attachment;

obtaining information of the objects in the message body;

determining that information of a first object fails to be downloaded, wherein the first object is one of the objects in the message body;

sending a second request to the server in response to determining that the information of the first object fails to be downloaded, wherein the second request comprises the email identifier and an object identifier of the first object, and the second request is used to request to obtain the information of the first object;

receiving a second response from the server; and extracting the information of the first object from the second response.

10. The non-transitory computer-readable storage medium according to claim 9, wherein the operations further comprise:

sending, by the electronic device, first prompt information if the information of the first object fails to be downloaded, wherein the first prompt information is used to indicate that the information of the first object fails to be downloaded, and the first prompt information is further used to request a user to check whether to re-download the information of the first object; and sending, by the electronic device, the second request to the server in response to a first operation entered by the user, wherein the first operation is used to indicate the electronic device to re-download the information of the first object.

11. The non-transitory computer-readable storage medium according to claim 9, wherein the operations further comprise:

sending, by the electronic device, second prompt information if the information of the first object fails to be extracted from the second response, wherein the second prompt information is used to indicate that the information of the first object fails to be downloaded, and the second prompt information is further used to request a user to check whether to re-download the information of the first object;

sending, by the electronic device, a third request to the server in response to a second operation entered by the user, wherein the second operation is used to indicate the electronic device to re-download the information of the first object, and the third request is used to request to obtain the information of the first object;

receiving, by the electronic device, a third response from the server; and extracting the information of the first object from the third response.

12. The non-transitory computer-readable storage medium according to claim 9, wherein the structure information is used to represent the data structure of the message body of the email, the data structure is used to represent a sequence of the objects in the message body, and the operations further comprise:

determining, by the electronic device, the object identifiers of the objects in the message body based on the sequence of the objects in the message body.

* * * * *